United States Patent
Yabe

(10) Patent No.: US 9,344,602 B2
(45) Date of Patent: May 17, 2016

(54) APPARATUS, PRINTING APPARATUS, CONTROL METHOD OF PRINTING, AND STORAGE MEDIUM

(71) Applicant: CANON KABUSHIKI KAISHA, Tokyo (JP)

(72) Inventor: Takashi Yabe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/631,550

(22) Filed: Feb. 25, 2015

(65) Prior Publication Data

US 2015/0254031 A1  Sep. 10, 2015

(30) Foreign Application Priority Data

Mar. 4, 2014  (JP) .................................. 2014-041633
Nov. 26, 2014  (JP) .................................. 2014-239163

(51) Int. Cl.
*G06F 3/12* (2006.01)
*G06K 15/02* (2006.01)
*H04N 1/46* (2006.01)
*H04N 1/403* (2006.01)

(52) U.S. Cl.
CPC ............ *H04N 1/465* (2013.01); *G06K 15/1823* (2013.01); *H04N 1/403* (2013.01)

(58) Field of Classification Search
CPC . G06F 3/1219; G06F 3/1254; G06K 15/1823; H04N 1/465
USPC ................. 358/2.1, 3.01; 382/279, 199; 347/9
See application file for complete search history.

(56) References Cited

U.S. PATENT DOCUMENTS

| 6,608,942 B1* | 8/2003 | Le ................................. 382/279 |
| 7,298,527 B2 | 11/2007 | Yabe |
| 7,751,085 B2 | 7/2010 | Yabe |
| 7,944,583 B2 | 5/2011 | Yabe |
| 8,310,719 B2 | 11/2012 | Yabe |
| 8,837,003 B2 | 9/2014 | Yabe |
| 2007/0126766 A1* | 6/2007 | Shimakawa et al. ............... 347/9 |
| 2014/0029059 A1* | 1/2014 | Kawasaki ..................... 358/3.01 |

FOREIGN PATENT DOCUMENTS

JP  2012-155415 A  8/2012

\* cited by examiner

*Primary Examiner* — Quang N Vo
(74) *Attorney, Agent, or Firm* — Fitzpatrick, Cella, Harper & Scinto

(57) ABSTRACT

There are provided: an attribute determination unit configured to determine an attribute of an object included in image data to be subjected to printing processing; a color conversion unit configured to convert the color space of the image data into a color space compatible with a printing apparatus in accordance with the determination results obtained by the attribute determination unit; an edge determination unit configured to determine an edge of an object included in the image data whose color space has been converted by the color conversion unit; and a black monochromatization unit configured to convert the color of a pixel, which is a pixel of an achromatic object of the objects of the image data whose color space has been converted into the color space compatible with the printing apparatus and which is a pixel determined to be an edge by the edge determination unit, into black alone.

14 Claims, 20 Drawing Sheets

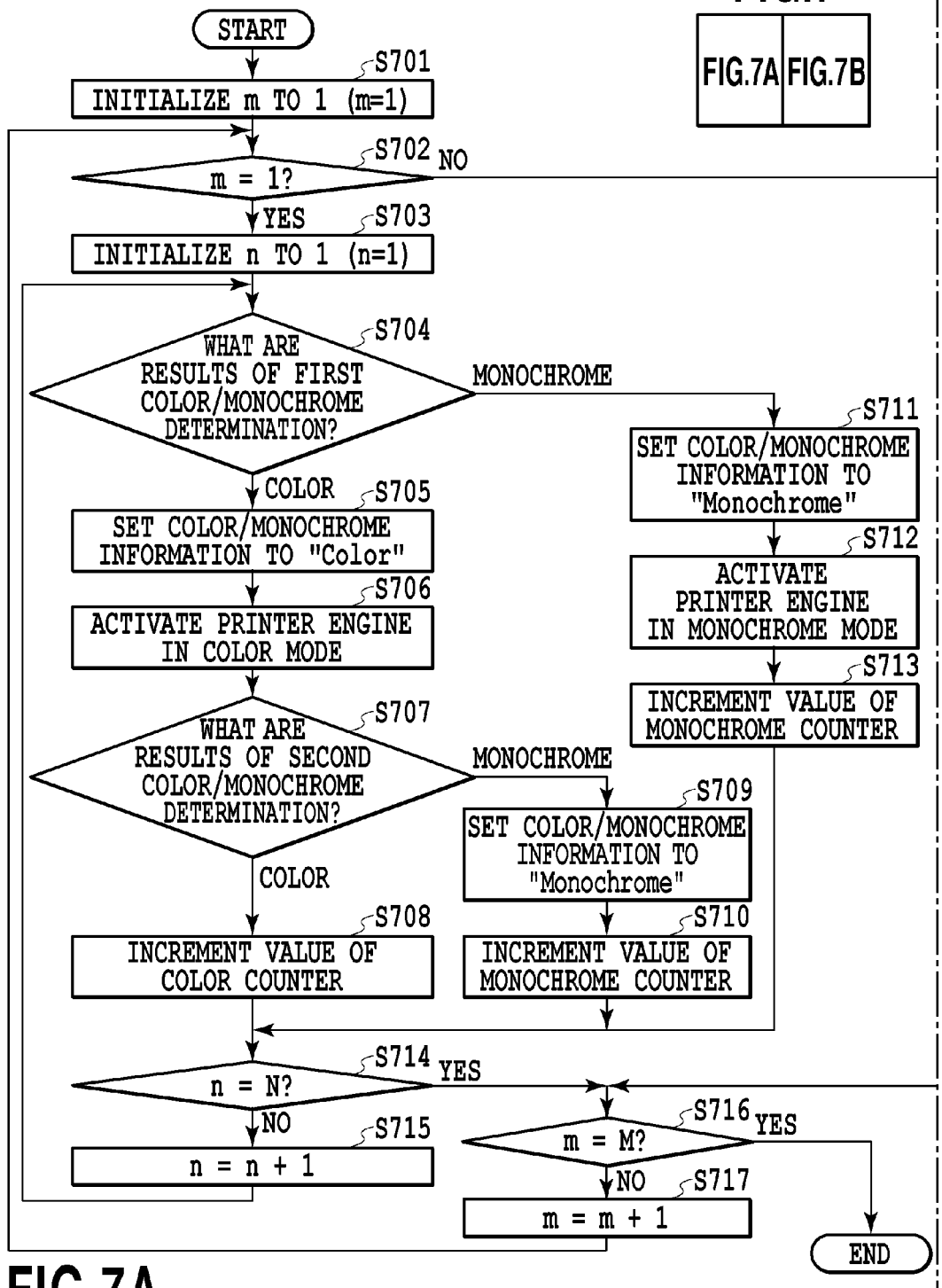

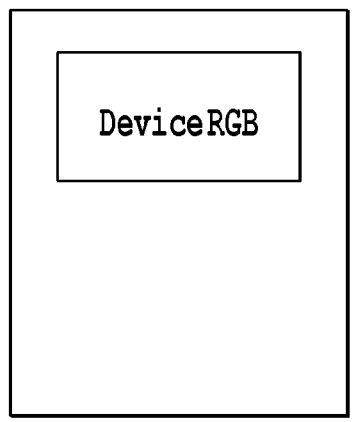 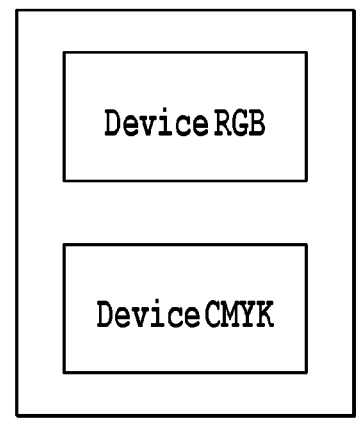
FIG.19A   FIG.19B

APPARATUS, PRINTING APPARATUS, CONTROL METHOD OF PRINTING, AND STORAGE MEDIUM

BACKGROUND OF THE INVENTION

1. Field of the Invention

The present invention relates to color/monochrome determination processing of a printing apparatus.

2. Description of the Related Art

A color printer automatically performs processing to determine whether PDL (Page Description Language) data is color or monochrome for each page and determines whether the printer is operated in the color mode or in the monochrome mode in accordance with the results of the color/monochrome determination processing for each page. Then, in the case where the PDL data is determined to be color by the color/monochrome determination processing, the printer activates in the color mode and the value of a color counter indicating that color image data is output is incremented. In the case where the PDL data is determined to be monochrome by the color/monochrome determination processing, the printer activates in the monochrome mode and the value of a monochrome counter indicating that monochrome image data is output is incremented. Then, a serves person charges a printer use fee to a user in accordance with the counting results of the color counter and the monochrome counter and periodically performs maintenance of the printer parts of cyan (C), magenta (M), and yellow (Y) used in color printing.

Japanese Patent Laid-Open No. 2012-155415 has disclosed a printing system aiming at improvement in throughput at the time of performing printing in units of copies including both color printing and monochrome printing. Specifically, a technique has been disclosed that enables printing in units of copies including both color printing and monochrome printing by the printing operation that needs to be performed only once by transmitting a monochrome conversion command to convert data into monochrome image data along with image data for color printing to the printing apparatus.

In the printing system disclosed in Japanese Patent Laid-Open No. 2012-155415, for image data that is to be printed, the number of copies of the total number of copies to be printed in monochrome printing is specified by a user. Because of this, in the case where monochrome image data is intermingled with the image data that is to be printed, the copies for which color printing is specified of the total number of copies to be printed (the total number of copies to be printed−the number of copies for which monochrome printing is specified), even for the monochrome image data, printing is performed in color. Further, depending on an image processing flow, there is a case where CMYK data is converted into K monochrome data (K monochromatization) after the data is determined to be color by the color/monochrome determination and thus the color data changes into monochrome data. As described above, printing of data that should be printed in monochrome originally in color consumes the parts, such as the developer unit and the drum that are provide for each color toner of CMY, more than necessary in the case of, for example, an electrophotographic printing apparatus.

In order to prevent the parts, such as the developer unit and the drum, from being consumed more than necessary, it is desirable to perform control so that color image data is printed in color and monochrome image data is printed in monochrome while taking into consideration improvement in throughput.

SUMMARY OF THE INVENTION

The apparatus according to the present invention includes an attribute determination unit configured to determine an attribute of an object included in image data to be subjected to printing processing, a color conversion unit configured to convert the color space of the image data into a color space compatible with a printing apparatus in accordance with the determination results obtained by the attribute determination unit, an edge determination unit configured to determine an edge of an object included in the image data whose color space has been converted by the color conversion unit, and a black monochromatization unit configured to convert the color of a pixel, which is a pixel of an achromatic object of the objects of the image data whose color space has been converted into the color space compatible with the printing apparatus and which is determined to be an edge by the edge determination unit, into black alone.

According to the present invention, it is made possible to implement appropriate printing processing in accordance with whether image data to be printed is color or monochrome.

Further features of the present invention will become apparent from the following description of exemplary embodiments (with reference to the attached drawings).

BRIEF DESCRIPTION OF THE DRAWINGS

FIG. 7 is a diagram showing the relationship between FIGS. 7A and 7B;

FIG. 7A is a flowchart showing details of operation mode control of a printer unit by referring to document management data;

FIGS. 19A and 19B are diagrams showing a color space of an object within a page in input print data, respectively.

DESCRIPTION OF THE EMBODIMENTS

Hereinafter, with reference to the attached drawings, the present invention is explained in detail in accordance with preferred embodiments. Configurations shown in the following embodiments are just an example, and the present invention is not limited to the configurations shown schematically.

First Embodiment

Figure 1:
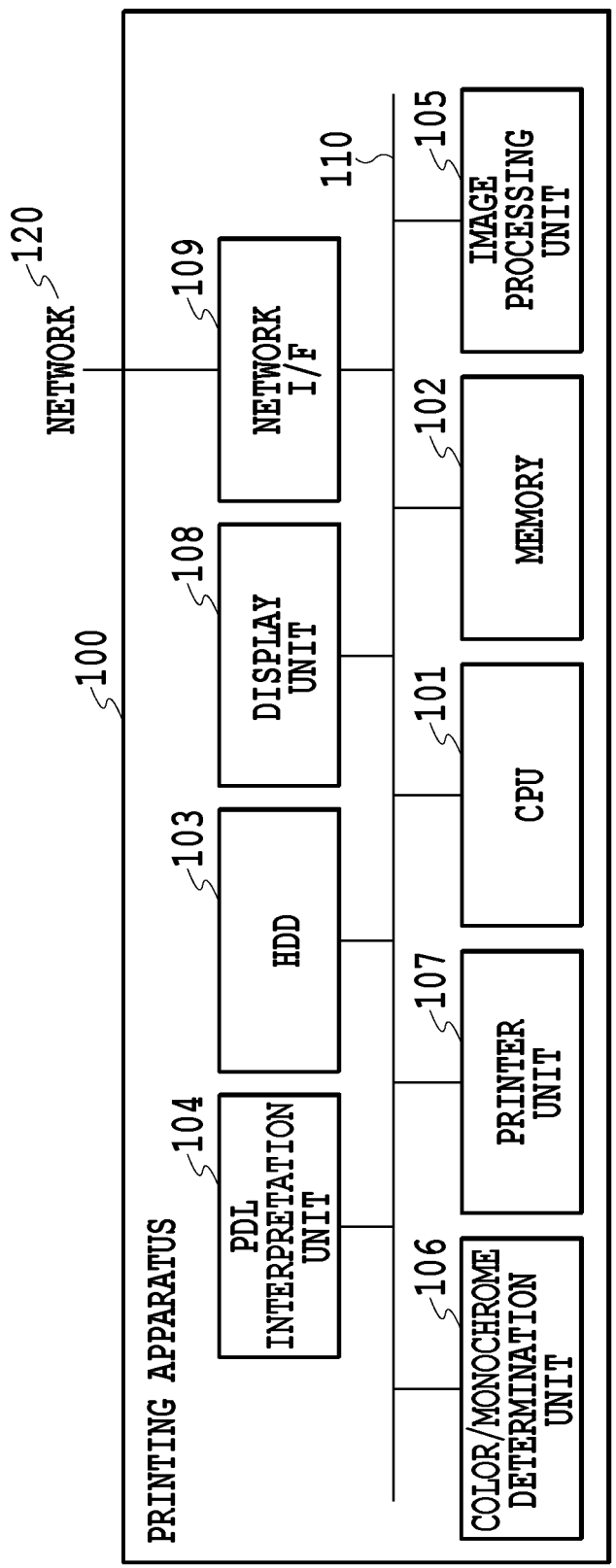
FIG. 1 is a block diagram showing an example of a configuration of a printing apparatus.

FIG. 1 is a block diagram showing an example of a configuration of a printing apparatus according to the present embodiment.

A printing apparatus 100 includes a CPU 101, a memory 102, an HDD 103, a PDL interpretation unit 104, an image processing unit 105, a color/monochrome determination unit 106, a printer unit 107, a display unit 108, and a network I/F 109 connected to one another via an internal bus 110. Then, the printing apparatus 100 is connected with a network 120 via the network I/F 109.

The CPU 101 is a processor that comprehensively controls the printing apparatus 100 and controls each unit connected via the internal bus 110.

The memory 102 includes a ROM that stores various commands (including application programs) executed by the CPU 101 to control the printing apparatus 100 and various kinds of data, and a RAM that functions as a work area of the CPU 101.

The HDD 103 saves various kinds of data such as received image data.

The PDL interpretation unit 104 performs processing to create a DL (Display List) based on PDL data etc. received from a PC (not shown) on the network 120, processing to generate bitmap data from the created DL, etc.

The image processing unit 105 performs image processing in accordance with the attribute of image data, besides the general image processing (color conversion, tone level correction processing, dither processing, etc.).

The color/monochrome determination unit 106 performs first color/monochrome determination processing that is performed by analyzing the bitmap data generated in the PDL interpretation unit 104, and second color/monochrome determination processing that is performed by analyzing the image data output from the image processing unit 105. The reason the determination of whether data is color or monochrome is performed in two steps as described above is that there is a case where even the image data determined to be color by the first color/monochrome determination processing may change into monochrome image data by black monochromatization processing, to be described later.

The printer unit 107 is a function unit configured to form a color image on a printing medium such as paper and is a portion generally called a printer engine. It is assumed that the printer unit 107 of the present embodiment adopts the electrophotographic system, has a resolution of 600 dpi, and is provided with stations separated for each color of CMYK including a photosensitive drum, a developer unit, etc., for each color of CMYK. However, the configuration of the printer unit 107 described here is just an example and the configuration is not limited to this.

The display unit 108 includes a liquid crystal panel having a touch screen function, or the like, and on which various kinds of information are displayed and further, a user gives various instructions via the screen displayed on the display unit 108.

The network interface 109 is an interface for performing communication, such as transmission and reception of image data, with the PC connected via the network 120, such as a LAN and the Internet. The PC converts print data created by an application into PDL data by a printer driver. In the case where a printing button is pressed down in the printer drive on the PC, the printer driver transmits the PDL data to the printing apparatus 100 via the network 120. Alternatively, a file, such as PDF, JPEG, and TIFF, is transmitted to the printing apparatus 100 via a remote UI (not shown) on the PC.

The components of the printing apparatus are not limited to the contents described above. For example, it may also be possible to provide an input unit including a mouse, a keyboard, etc., for a user to perform various operations in place of the touch screen, and the configuration of the printing apparatus may accept appropriate addition or modification in accordance with purposes etc.

Figure 2:
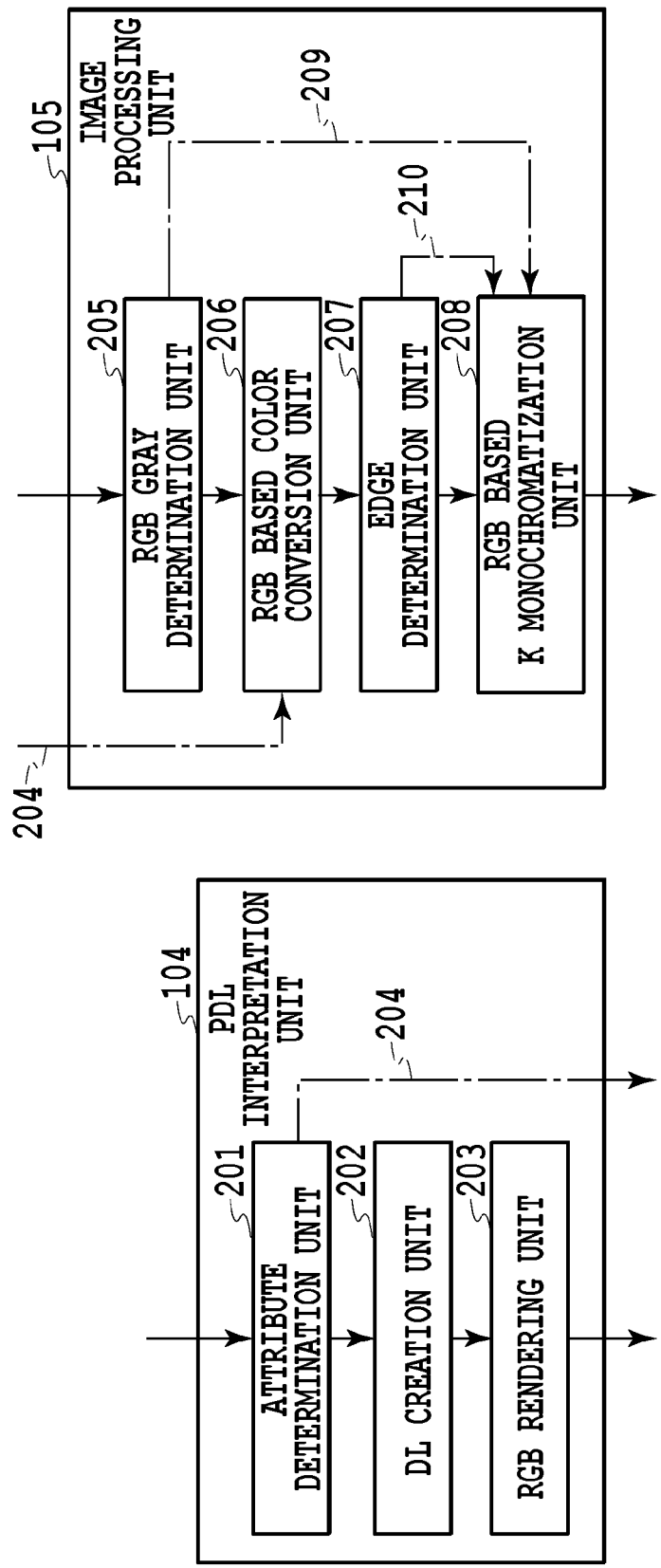
FIGS. 2A and 2B are function block diagrams showing an internal configuration of a PDL interpretation unit and an internal configuration of an image processing unit, respectively, in the case where a rendering color space is RGB according to a first embodiment.

FIGS. 2A and 2B are function block diagrams showing the internal configuration of the PDL interpretation unit 104 and the internal configuration of the image processing unit 105, respectively, in the case where a bitmap image whose output is the RGB color space (bitmap image whose rendering color space is the RGB color space) is generated according to the present embodiment. The PDL interpretation unit 104 includes an attribute determination unit 201, a DL creation unit 202, and an RGB rendering unit 203. The image processing unit 105 includes an RGB gray determination unit 205, an RGB based color conversion unit 206, an edge determination unit 207, and an RGB based K monochromatization unit 208.

First, each unit of the PDL interpretation unit 104 shown in FIG. 2A is explained.

The attribute determination unit 201 performs processing (attribute determination processing) to determine the attribute (character, line, graphic, image (photo) of an object included in input image data (print data). The results of the determination are output as a signal (object attribute signal) 204 specifying the attribute of an object.

The DL creation unit 202 interprets input PDL data for each page and creates a display list (hereinafter, DL) for generating a bitmap image in accordance with the printer unit 107. The PDL data in the present embodiment is data described in a PDL language (e.g., LIPS, PCL) that performs rendering in the RGB color space. Further, a DL is created in which instructions to perform resolution conversion (enlargement, reduction, etc.) for converting input image data into data in accordance with the printer unit 107 are given, the printing position is specified, and so on, even in the case where the input image data is a TIFF or a JPEG file.

The RGB rendering unit 203 generates bitmap data in the RGB color space in accordance with the resolution of the printer unit 107 based on the DL created by the DL creation unit 202.

The PDL interpretation unit 104 shown in FIG. 2A does not have a color conversion unit because both the color space of input image data and the color space of output image data are the same RGB color space.

Next, each unit of the image processing unit 105 shown in FIG. 2B is explained.

The RGB gray determination unit 205 determines whether or not each pixel is gray (R=G=B), which is an achromatic color, from the bitmap data in the RGB color space. The results of the determination are output as a gray determination signal 209.

The RGB based color conversion unit 206 performs processing (first color conversion processing) to convert the RGB color space of input image data into the CMYK color space of the printer unit 107 in accordance with the above-described object attribute signal 204. Specifically, in the case where the attribute specified by the object attribute signal 204 is a character or a line, gray compensation color conversion is performed and in the case where the attribute is other than a character or a line (in the case of a graphic or an image), non-gray compensation color conversion is performed. Here, gray compensation color conversion refers to processing to perform conversion into values of CMYK having only the value of K (C=M=Y=0) in the case where the values of RGB are the same (R=G=B). Then, non-gray compensation color conversion refers to processing to perform conversion into values of CMYK having the values of other than K (CMY also have values).

The edge determination unit 207 performs processing (edge determination processing) to analyze the bitmap data in the CMYK color space into which converted by the RGB based color conversion unit 206 and to determine an edge included in the bitmap image. The results of the determination are output as an edge determination signal 210. The edge determination may not be determination that is performed for all the pixels in the bitmap image. For example, the edge determination may be determination that is performed only for pixels that are not determined to be a character or a line. This also applies to other embodiments.

The RGB based K monochromatization unit 208 performs processing (RGB based K monochromatization processing) to convert a CMYK image signal into an image signal having the value of only K based on the gray determination signal 209, which is the output signal of the RGB gray determination unit 205, and the edge determination signal 210, which is the output signal of the edge determination unit 207. In other words, the pixel determined to be an edge and also determined to be gray is converted into an image signal having the value of only K. The K monochromatization processing by the RGB based K monochromatization determination unit 208 may not be processing that is applied to all the pixels in a bitmap image. For example, the K monochromatization processing may be processing that is applied only to pixels not determined to be a character or a line.

Although omitted here, the image processing unit 105 also includes the function of the general image processing, such as tone level correction processing and dither processing, and here, it is assumed that the image processing is performed in accordance with necessity.

Figure 3:
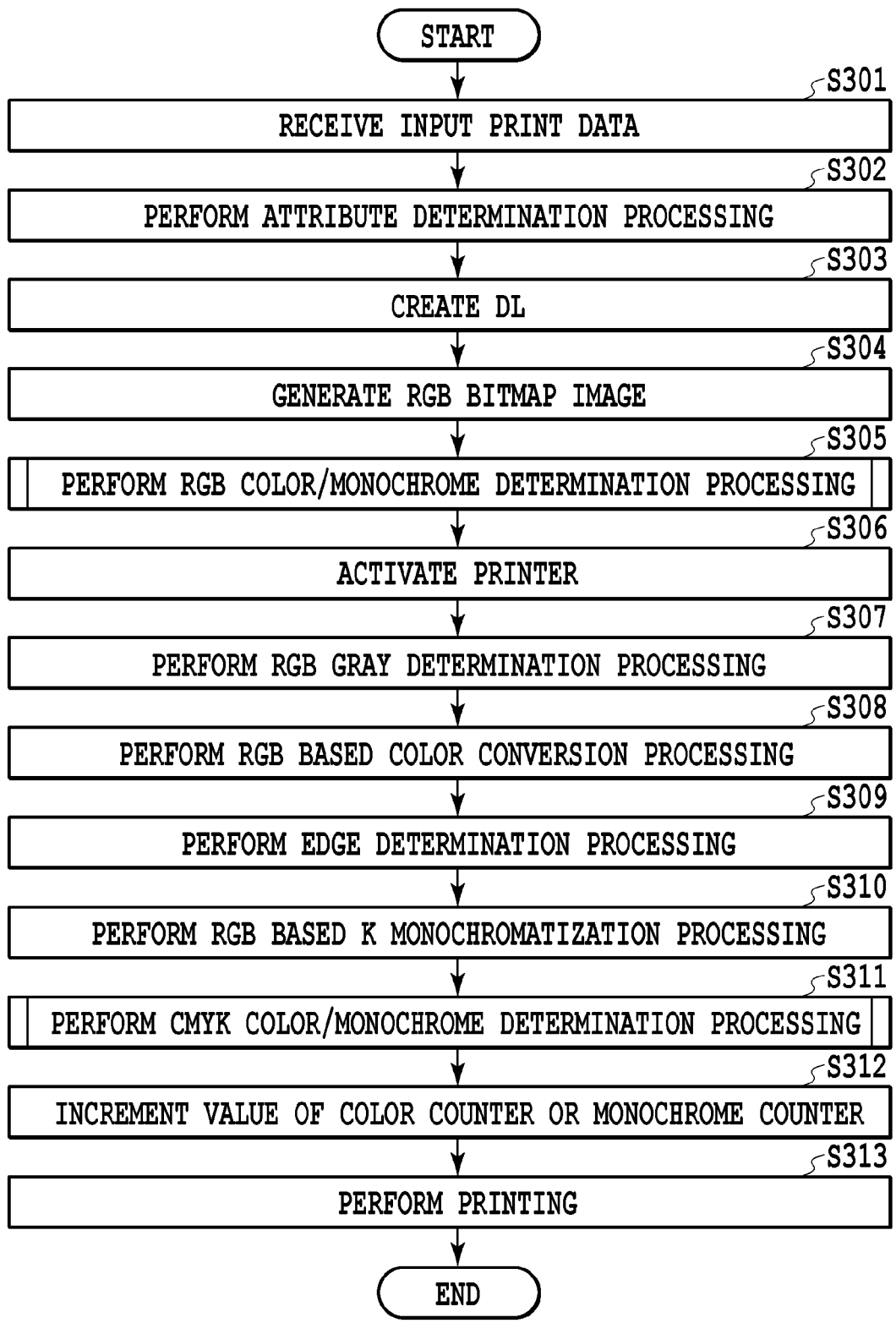
FIG. 3 is a flowchart showing a flow of printing processing in a printing apparatus in the case where the rendering color space is the RGB according to the first embodiment.

FIG. 3 is a flowchart showing a flow of printing processing in the printing apparatus 100 in the case where rendering is performed in the RGB color space according to the present embodiment. The series of processing is implemented by the CPU 101 loading programs stored in the HDD 103 onto the RAM within the memory 102 and executing the programs.

At step 301, the printing apparatus 100 receives print data to be printed from a PC etc. on the network 120 via the network I/F 109. The received print data (input print data) is sent to the PDL interpretation unit 104 and in the PDL interpretation unit 104, the processing at each of step 302 to step 304 below is performed.

At step 302, the attribute determination unit 201 of the PDL interpretation unit 104 determines the attribute (character, line, graphic, image) of an object included in the input print data. In the case where the input print data is PDL data, the attribute for each object is determined by analyzing commands representing the objects. For example, in the case of a command having information indicative of a straight line connecting point A and point B and having a thickness of five pixels, the attribute of the object is determined to be a line. Further, in the case of a command having information indicative of a character (0000101010: character code), the attribute of the object is determined to be a character. In the case where the input print data is a file in the raster image format, such as TIFF, JPEG, and BMP, the attribute of the file data portion is determined to be an image. The results of the determination are output as the object attribute signal 204 from the attribute determination unit 201 and are used in first color/monochrome determination processing (RGB color/monochrome determination processing) and RGB based color conversion processing, to be described later.

At step 303, the DL creation unit 202 converts each command of the above-described PDL data into each drawing command and creates a DL for generating a bitmap image in accordance with the printer unit 107. The created DL is sent to the RGB rendering unit 203.

At step 304, the RGB rendering unit 203 generates a bitmap image in the RGB color space for each page based on the DL created at step 303. The data of the generated bitmap image in the RGB color space (hereinafter, RGB bitmap data) is saved in the HDD 103 etc.

At step 305, the color/monochrome determination unit 106 analyzes the RGB bitmap data generated at step 304 and performs color/monochrome determination processing (first color/monochrome determination processing) for the RGB color space for each page. Details of the first color/monochrome determination processing will be described later. The results of the first color/monochrome determination processing are managed by document management data including color/monochrome information that is created for each page and which indicates color or monochrome (e.g., a flag that has a value of "1" in the case of color, and "0" in the case of monochrome). The document management data is held in the HDD 103.

At step 306, the CPU 101 activates the printer unit 107 in a predetermined operation mode in accordance with the results of the first color/monochrome determination processing.

Specifically, the results of the determination at step 305 indicate that a page determined to be color image data exists, the printer engine, which is the printer unit 107, is activated in the color mode that uses all the stations of CMYK. On the other hand, in the case where the results of the determination at step 305 indicate that all the pages are monochrome image data, the printer engine, which is the printer unit 107, is activated in the monochrome mode that uses only the K station. The reason the printer unit 107 is activated in the stage where all the processing is not completed as described above is that the preparation for, in particular, the color mode takes along time, and therefore, the printer unit 107 is activated in the early stage so as to reduce the time from the pressing-down of the printing button in the printer driver until the printed matter is output (so as to increase throughput). The RGB bitmap data on which the first color/monochrome determination processing has been performed is sent to the image processing unit 105.

In the image processing unit 105, the processing at each of step 307 to step 310 below is performed.

At step 307, the RGB gray determination unit 205 determines a gray portion where the pixel values of R, G, and B are R=G=B from the bitmap data in the RGB color space. Information for specifying the pixel (gray pixel) determined to be gray is output as the gray determination signal 209 and used by the RGB based K monochromatization unit 208, to be described later.

At step 308, the RGB based color conversion unit 206 performs processing (RGB based color conversion processing) to convert RGB data into CMYK data in accordance with the object attribute signal 204, which is the results of the attribute determination processing at step 302. Specifically, for the portion determined to be an object of a character or a line by the attribute determination processing (pixel corresponding to the object), the gray compensation color conversion described previously is performed. Then, for the portion determined to be an object of a graphic or an image, other than a character and a line, by the attribute determination processing (pixel corresponding to the object), the non-gray compensation color conversion described previously is performed. Due to this, for the object of a character or a line, gray is represented by the K monochrome and for the object other than a character and a line, gray is represented by CMYK. Here, objects are divided into objects of characters and lines and objects other than those, but, for example, it may also be possible to divide objects into objects of characters, lines, and graphics and objects other than those. For graphics and images, which are objects for which smoothness of the tone level is important, the purpose of dividing objects is to perform the non-gray compensation color conversion, and therefore, it is only required to perform a division in accordance with the purpose. By the color conversion processing such as this, the bitmap data in the RGB color space is converted into bitmap data in the CMYK color space.

At step 309, the edge determination unit 207 analyzes the bitmap data converted into the CMYK color space (hereinafter, CMYK bitmap data) by the RGB based color conversion processing and determines an edge included in the CMYK bitmap data. Specific explanation is given. The CMYK bitmap data is developed onto the bit map memory and edge determination processing using Laplacian filter processing with a filter coefficient as below is performed for each predetermined area (e.g., 5 pixels×5 pixels) of the CMYK bitmap data. Due to this, it is possible to determine whether or not the pixel is a pixel configuring an edge (edge pixel).

| −1 | −3 | −4 | −3 | −1 | |
|---|---|---|---|---|---|
| −3 | 0 | 6 | 0 | −3 | |
| −4 | 6 | 20 | 6 | −4 | (filter coefficient) |
| −3 | 0 | 6 | 0 | −3 | |
| −1 | −3 | −4 | −3 | −1 | |

The results of the determination (signal that specifies an edge pixel) are output as the edge determination signal 210 from the edge determination unit 207 and used in the RGB based K monochromatization unit 208, to be described later. However, the edge determination method is not limited to the above-described Laplacian filter processing and any method may be used as long as an edge pixel can be determined.

Figure 4:
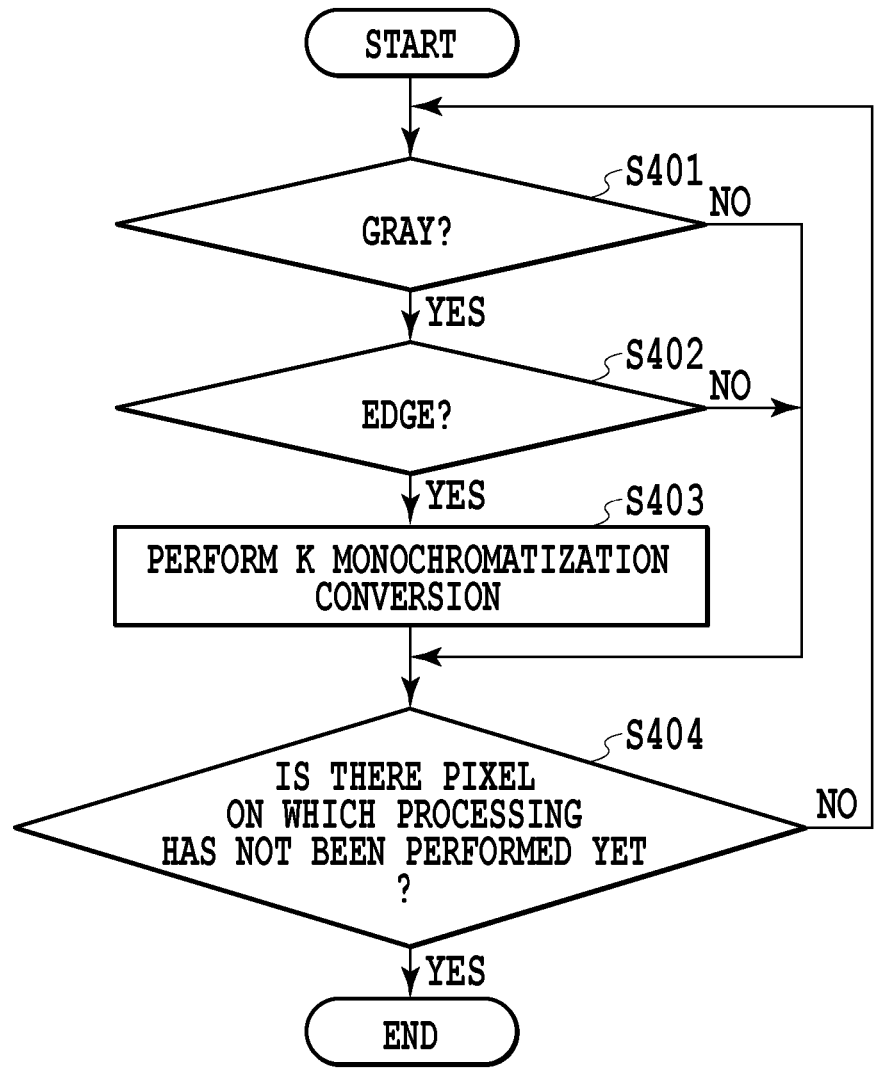
FIG. 4 is a flowchart showing details of RGB based K monochromatization processing according to the first embodiment.

At step 310, the RGB based K monochromatization unit 208 performs processing (RGB based K monochromatization processing) to convert the specific CMYK values into bitmap data of the CMYK values of the K monochrome by using the gray determination signal 209 and the edge determination signal 210. Specifically, the CMYK values of the specific pixel, which is a gray pixel and also an edge pixel, are converted into the CMYK values of the K monochrome. FIG. 4 is a flowchart showing details of the RGB based K monochromatization processing.

At step 401, the RGB based K monochromatization unit 208 determines whether or not the pixel of interest is a gray pixel of R=G=B based on the gray determination signal 209 received from the RGB gray determination unit 205. In the case where the pixel of interest is a gray pixel, the processing proceeds to step 402. On the other hand, in the case where the pixel of interest is not a gray pixel, the processing proceeds to step 404.

At step 402, the RGB based K monochromatization unit 208 determines whether or not the pixel of interest is an edge pixel based on the edge determination signal 210 received from the edge determination unit 207. In the case where the pixel of interest is an edge pixel, the processing proceeds to step 403. On the other hand, in the case where the pixel of interest is not an edge pixel, the processing proceeds to step 404. In this manner, in the case where the pixel of interest is not a gray pixel or an edge pixel, the K monochromatization conversion processing is skipped as a result.

Figure 5:
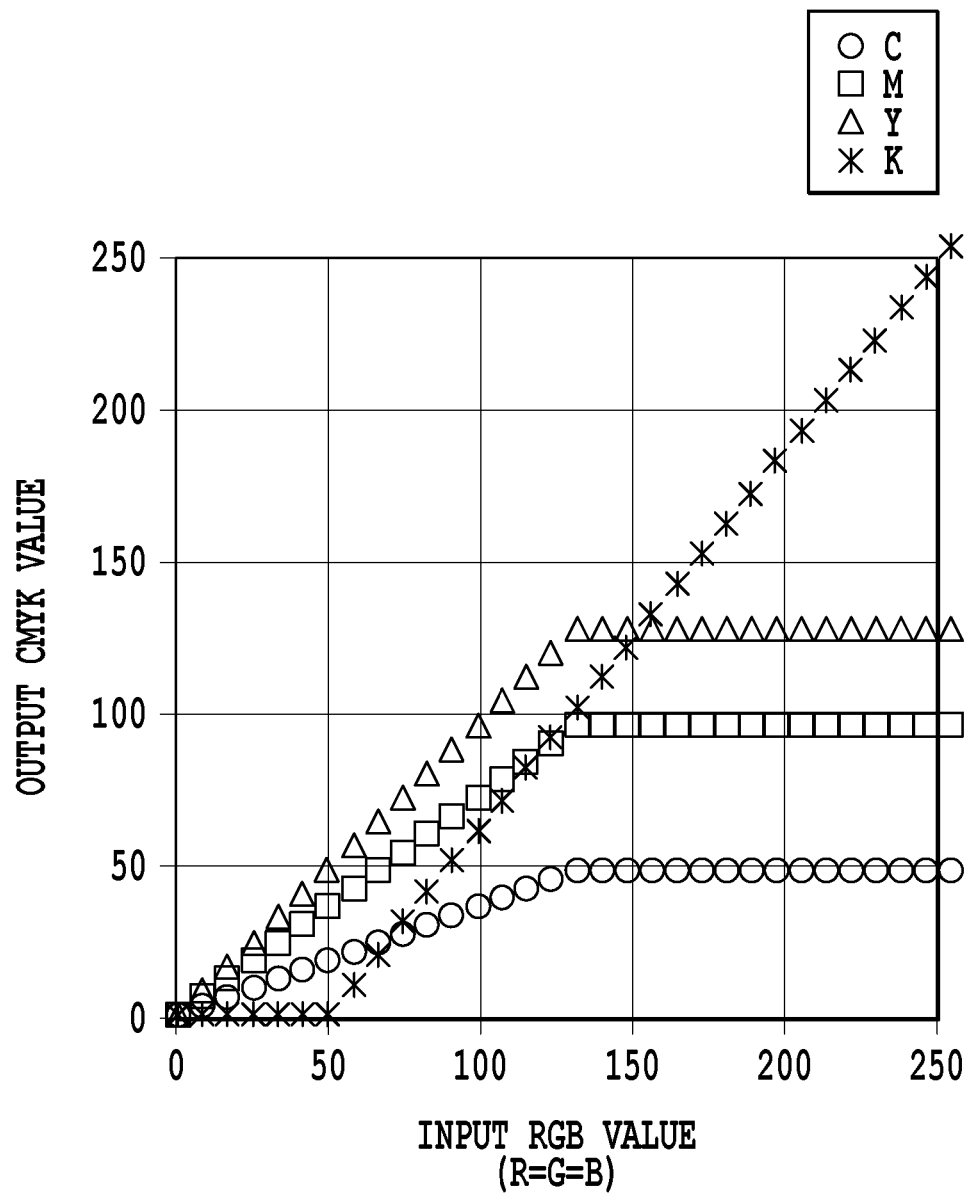
FIG. 5 is a graph indicating CMYK values that are output values in the case where RGB values that are input values are R=G=B.

At step 403, the RGB based K monochromatization unit 208 performs K monochromatization conversion processing on the pixel of interest, which is a gray pixel and also an edge pixel. In this case, the processing-target bitmap data has already been converted from the RGB color space into the CMYK color space, and therefore, it is necessary to convert the bitmap data from the CMYK color space into the K monochrome. FIG. 5 is a graph indicating the CMYK values, which are the output values, in the case where the RGB values, which are the input values of the RGB based monochromatization unit 206, are R=G=B. Conversely speaking, in the case where each value of CMYK as an output value forms a combination as illustrated in FIG. 5, the input values are R=G=B. Here, it may also be possible to find the values of RGB by using all the values of the four colors of CMYK, but in such a case, calculation is complicated and the circuit scale increases. On the other hand, in the case where an attempt is made to find the values of RGB from only the value of K, the value of K is "0" while the input RGB values are between "0 and 50", and therefore, it is not possible to find the RGB values. Further, in the case where only one of the values of CMY is used, the value of each color increases linearly until the input RGB values reach about "130", but after that, the values become constant, and therefore, it is not possible to find the RGB values uniquely. Because of this, in the present embodiment, the value of R=G=B is found from K and one of the other colors (CMY). Due to this, the calculation is made simple and the circuit scale can be reduced.

Figure 6:
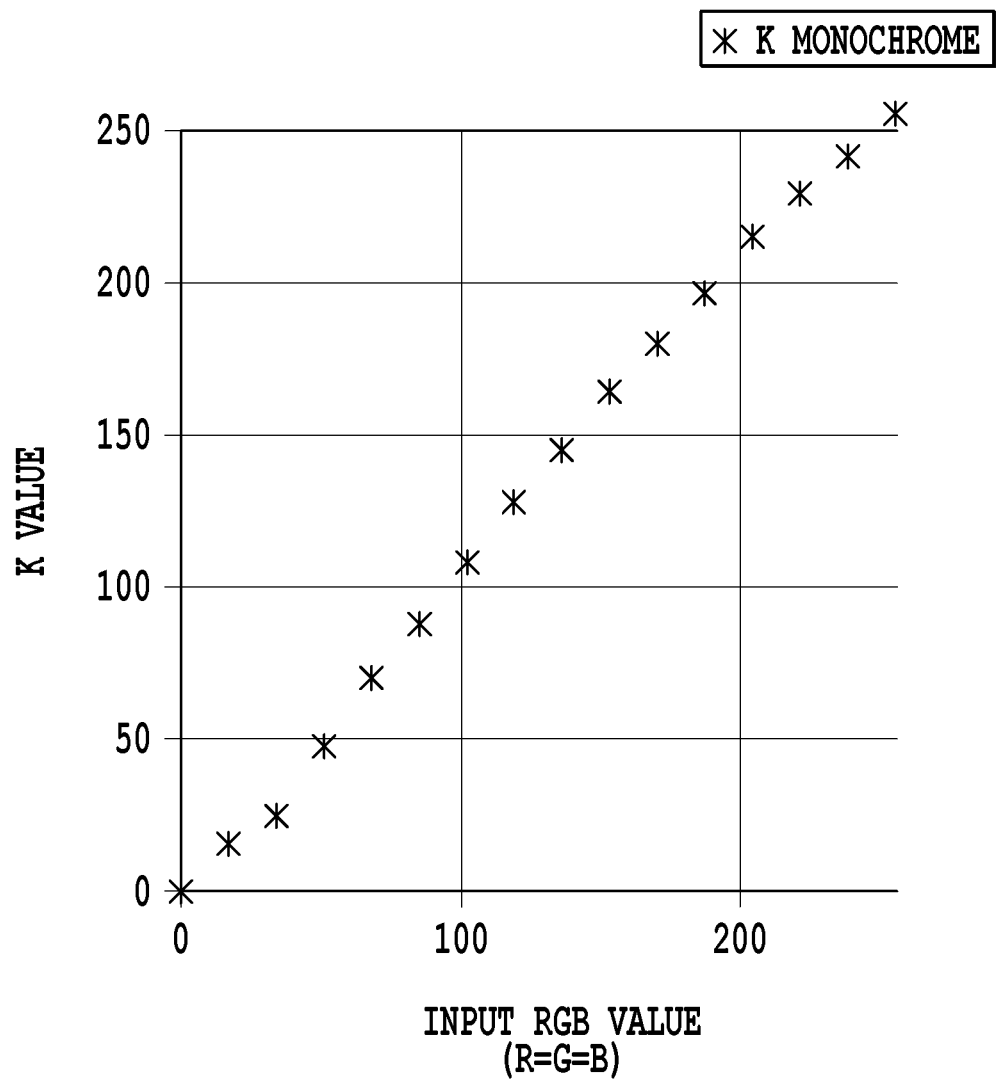
FIG. 6 is a graph indicating values of K at the time of gray compensation in the case where R=G=B.

It may also be possible to take the value of K at the time of gray compensation as the value of K in the case where R=G=B. FIG. 6 is a graph indicating the value of K at the time of gray compensation in the case where RGB. For example, it is assumed that R=G=B=100 is found from the values C=36 and K=60 from the graph in FIG. 5 described above. In this case, the value of K at the time of gray compensation is "108" from FIG. 6. Similarly, in the case where R=G=B=50 is found from the values C=18 and K=0, the value of K at the time of gray compensation is "48" from FIG. 6. In this manner, the K monochromatization processing is achieved. Here, the value of K at the time of gray compensation is found from the values of C and K, but it may also be possible to find the value of K from the sum of the values of CMYK, or to find the value of K by using another method.

At step 404, the RGB based K monochromatization unit 208 determines whether or not there is a pixel on which the processing has not been performed yet within the CMYK bitmap data. In the case where there is a pixel on which the processing has not been performed yet, the processing returns to step 401 and the processing is continued by taking the next pixel to be the pixel of interest. On the other hand, in the case where the processing has been completed for all the pixels, the present processing is exited.

The above is the contents of the RGB based K monochromatization processing.

Explanation is returned to the flowchart in FIG. 3.

At step 311, the color/monochrome determination unit 106 analyzes the bitmap data in the CMYK color space, which is the output image data on which the image processing has been performed by the image processing unit 105, and determines whether each page is a color page (second color/monochrome determination processing). Details of the second color/monochrome determination processing will be described later. The results of the second color/monochrome determination processing are reflected in the document management data that is generated by the first color/monochrome determination processing (step 305) and held. For example, in the case where the page that has been determined to be color by the first color/monochrome determination processing and to which a flag value of "1" is attached as color/monochrome information is determined to be monochrome by the second color/monochrome determination processing, the flag value is modified/updated to "0". By modifying/updating the document management data in this manner, it is possible to avoid the printer unit 107 from activating in the color mode in the case where monochrome printing is sufficient at the time of repeatedly printing the same image data. Details of the operation mode control of a printer by referring to document management data will be described later.

At step 312, the CPU 101 increments the value of the color counter for counting the pages printed in color or the values of the monochrome counter for counting the pages printed in monochrome in accordance with the results of the second color/monochrome determination processing. The results of the counting are displayed on the display unit 108.

At step 313, the CPU 101 give instructions to print output image data to the printer unit 107. Upon receipt of the instructions, the printer unit 107 forms an image on a printing medium such as paper and outputs printed matter.

The above is the flow of the printing processing in the printing apparatus 100 according to the present embodiment.

Figure 7B:
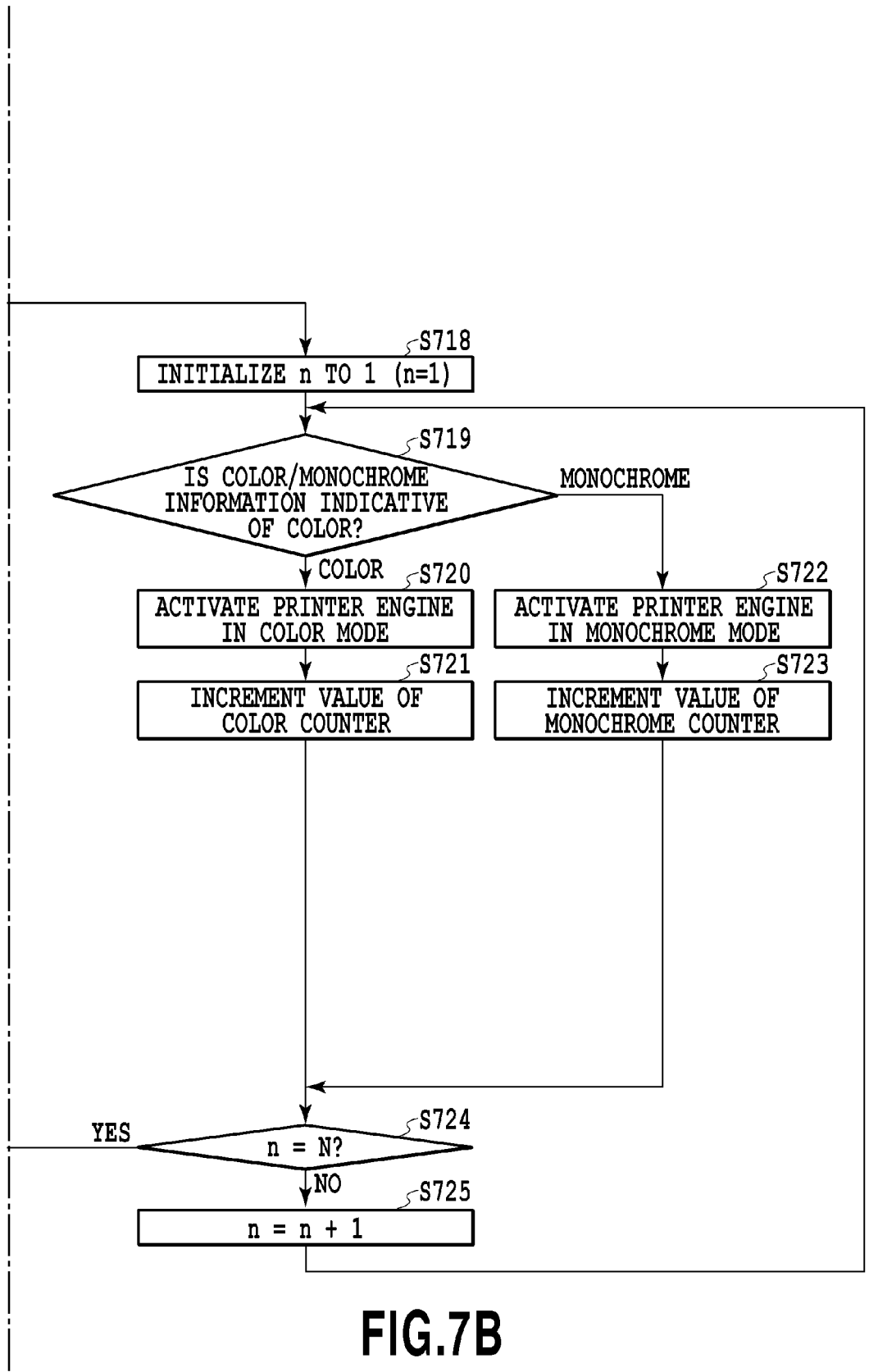
FIG. 7B is a flowchart showing details of operation mode control of a printer unit by referring to document management data.

FIGS. 7A and 7B are flowcharts showing details of the operation mode control of the printer unit 107 by referring to document management data. Here, the case is supposed where the printing button is pressed down in the driver on the PC with the setting being done so that M copies of the input image data having N pages are printed. The series of processing is also implemented by the CPU 101 loading programs stored in the HDD 103 onto the RAM within the memory 102 and executing the programs.

At step 701, the CPU 101 initializes the number of copies counter for counting the number of printed copies. Specifically, the CPU 101 sets "1" to a count value (m) of the number of copies counter.

At step 702, the CPU 101 determines whether the current printing processing is the processing to print the first copy. Specifically, the CPU 101 determines whether the count value of the number of copies counter described above is m=1. In the case where the current printing processing is determined to be the processing to print the first copy, the processing proceeds to step 703. On the other hand, in the case where it is determined that the current printing processing is not the processing to print the first copy, the processing proceeds to step 718.

At step 703, the CPU 101 initializes the page counter for counting the number of printed pages. Specifically, the CPU 101 sets "1" to a counter value (n) of the page counter.

At step 704, the CPU 101 acquires the results of the first color/monochrome determination processing described previously. In the case where the acquired results of the determination indicate color, the processing proceeds to step 705. On the other hand, in the case where the acquired results of the determination indicate monochrome, the processing proceeds to step 711.

At step 705, the CPU 101 sets the color/monochrome information within the document management data of a page on which the printing processing is being performed to "Color".

At step 706, the CPU 101 activates the printer unit 107 in the color mode.

At step 707, the CPU 101 acquires the results of the second color/monochrome determination processing described previously. In the case where the acquired results of the determination indicate color, the processing proceeds to step 708. On the other hand, in the case where the acquired results of the determination indicate monochrome, the processing proceeds to step 709.

At step 708, the CPU 101 increments (+1) the value of the color counter while maintaining the setting contents of "Color" of the color/monochrome information in the document management data.

At step 709, the CPU 101 sets the color/monochrome information within the document management data of a page on which the printing processing is being performed to "Monochrome".

At step 710, the CPU 101 increments (+1) the value of the monochrome counter.

At step 711, the CPU 101 sets the color/monochrome information within the document management data of a page on which the printing processing is being performed to "Monochrome".

At step 712, the CPU 101 activates the printer unit 107 in the monochrome mode.

At step 713, the CPU 101 increments (+1) the value of the monochrome counter.

At step 714, the CPU 101 determines whether the printing processing for all the pages (here, N pages) has been completed. Specifically, the CPU 101 checks whether the count value of the page counter is n=N. In the case where the processing for all the pages has been completed (in the case where n=N), the processing proceeds to step 716. In the case where there is a page on which the processing has not been performed yet (in the case where n<N), the processing proceeds to step 715.

At step 715, the CPU 101 increments (+1) the value of the page counter. After the value of the page counter is incremented, the processing returns to step 704 and the processing of the next page is started.

At step 706, the CPU 101 determines whether the printing processing for all the specified number of copies has been completed. Specifically, the CPU 101 checks whether the value of the number of copies counter is m=M. In the case where the processing for all the number of copies has been completed (in the case where m=M), the present processing is exited. On the other hand, in the case where the processing for all the number of copies has not completed yet (in the case where m<M), the processing proceeds to step 717.

At step 717, the CPU 101 increments (+1) the value of the number of copies counter. After the value of the number of copies counter is incremented, the processing returns to step 702, but in this case, it is determined that the printing processing is not for the first copy at step 702, and therefore, the processing proceeds to step 718 to perform the processing of the second and subsequent copies.

At step 718 and subsequent steps, whether the page is color image data or monochrome image data has already been settled for all the pages in the processing of the first copy, and therefore, the operation mode of the printer unit 107 is controlled in accordance with the color/monochrome information within the document management data. Hereinafter, detailed explanation is given.

First, at step 718, the CPU 101 initializes the page counter as at step 703.

At step 719, the CPU 101 refers to the document management data and determines whether the page on which the printing processing is being performed is color or monochrome. In the present embodiment, in the case where the flag value as color/monochrome information is "1", the page is determined to be color and in the case of "0", the page is determined to be monochrome as a result. In the case where the page is color, the processing proceeds to step 720. On the other hand, in the case where the page is monochrome, the processing proceeds to step 722.

At step 720, the CPU 101 performs control so that the printer unit 107 operates in the color mode. In the case where the printer unit 107 has been operating in the color mode because the processing is for the second and subsequent copies and the page on which the printing processing has been performed immediately before the control of the CPU 101 is color, the operation mode is maintained. On the other hand, in the case where the printer unit 107 has been operating in the monochrome mode because the page on which the printing processing has been performed immediately before is monochrome, control is performed so that the printer unit 107 activates in the color mode.

At step 721, the CPU 101 increments (+1) the value of the color counter and the processing proceeds to step 724.

At step 722, the CPU 101 performs control so that the printer unit 107 operates in the monochrome mode. In the case where the printer unit 107 has been operating in the monochrome mode because the processing is for the second and subsequent copies and the page on which the printing processing has been performed immediately before the control of the CPU 101 is monochrome, the operation mode is maintained. On the other hand, in the case where the printer unit 107 has been operating in the color mode because the page on which the printing processing has been performed immediately before is color, control is performed so that the printer unit 107 activates in the monochrome mode.

At step 723, the CPU 101 increments (+1) the value of the monochrome counter and the processing proceeds to step 724.

At step 724, the CPU 101 determines whether the printing processing for all the pages (here, N pages) has been completed. Specifically, the CPU 101 checks whether the counter value of the page counter is n=N. In the case where the printing processing for all the pages has been completed (in the case where n=N), the processing proceeds to step 716 and whether the printing processing for all the specified number of copies has been completed is determined. On the other hand, in the case where there is a page on which the processing has not been performed yet (in the case where n<N), the processing proceeds to step 725.

At step 725, the CPU 101 increments (+1) the value of the page counter. After the value of the page counter is incremented, the processing returns to step 719 and the processing of the next page is started.

The above is the contents of the operation mode control of the printer unit 107 by referring to the document management data.

By the control such as this, even in the case where the printer unit 107 has activated in the color mode in the printing processing of the first copy, for the image data that is counted as monochrome, it is possible to activate the printer unit 107 in the monochrome mode (naturally, counted as monochrome) in the printing processing of the second copy. In other words, it is possible to appropriately switch between operating the printer in the color mode and operating the printer in the monochrome mode. As a result of this, it is possible to suppress the parts of the printer unit 107 from being consumed wastefully.

Finally, details of the first color/monochrome determination processing and the second color/monochrome determination processing described above are explained. The first color/monochrome determination processing differs from the second color/monochrome determination processing in that the processing-target image data is bitmap data immediately after rendering in the first color/monochrome determination processing and the processing-target image data is image data after all the necessary image processing has been performed thereon in the second color/monochrome determination processing. However, this different point does not affect the contents of the color/monochrome determination processing and both are basically the same processing. Hereinafter, the color/monochrome determination processing is explained in detail, but for convenience of explanation, the second color/monochrome determination processing is explained first.

Figure 8:
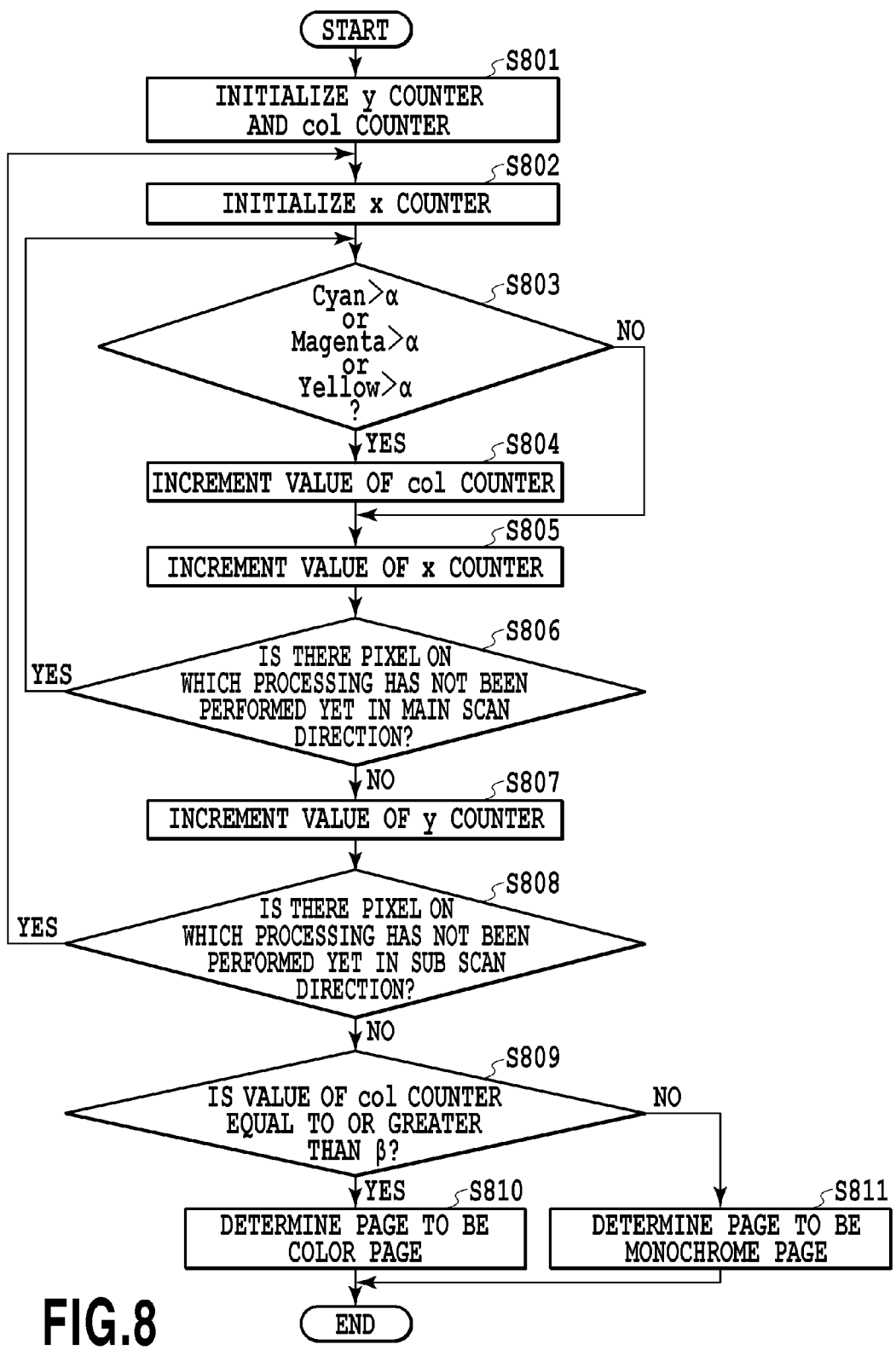
FIG. 8 is a flowchart showing a flow of second color/monochrome determination processing (CMYK color/monochrome determination processing)

FIG. 8 is a flowchart showing a flow of the second color/monochrome determination processing (CMYK color/monochrome determination processing). Here, explanation is given on the assumption that the processing-target page is represented by each pixel of CMYK and the page includes X pixels in the main scan direction and Y pixels in the sub scan direction.

At step 801, the color/monochrome determination unit 106 initializes a counter for counting the pixels in the sub scan direction (hereinafter, y counter) and a counter for counting the color pixels (hereinafter, col counter), respectively. Specifically, the color/monochrome determination unit 106 sets "0" to the count value of the y counter and to that of the col counter, respectively.

At step 802, the color/monochrome determination unit 106 initializes a counter for counting the pixels in the main scan direction (x counter). Specifically, the color/monochrome determination unit 106 sets "0" to the count value of the x counter.

At step 803, the color/monochrome determination unit 106 determines whether the processing-target pixel is a color pixel that is printed by using the color toner of CMYK. Here, it is assumed that in the case where one of the CMY values in the processing-target pixel is greater than a threshold value α determined in advance, the processing-target pixel is determined to be a color pixel. The threshold value α is set to an arbitrary value. In the case where the color reproducibility of the printer is good, it is sufficient to set, for example, α=0 so that the processing-target pixel is determined to be a color pixel on a condition that the processing-target pixel has CMY values if any. In the case where the color reproducibility of the printer is not so good and it is difficult to reproduce a color pixel whose density is low, it is sufficient to set, for example, α=5 so that the processing-target pixel is determined to be a color pixel only on a condition that the processing-target pixel has CMY values equal to or greater than a certain value. It is assumed that the threshold value α that is set in advance in this manner is held in the HDD 103 etc. In the case where the processing-target pixel is determined to be a color pixel, the processing proceeds to step 804. On the other hand, in the case where it is determined that the processing-target pixel is not a color pixel (determined to be a monochrome pixel), the processing proceeds to step 805.

At step 804, the color/monochrome determination unit 106 increments (+1) the value of the col counter.

After the determination of one pixel in the main scan direction is completed, at step 805, the color/monochrome determination unit 106 increments (+1) the value of the x counter.

At step 806, the color/monochrome determination unit 106 determines whether the determination processing of all the pixels (X pixels) in the main scan direction has been completed. In the case where the determination processing of all the pixels in the main scan direction has been completed, the processing proceeds to step 807. On the other hand, in the case where there exists a pixel(s) in the main scan direction on which the processing has not been performed yet, the processing returns to step 803 and the determination processing of the next pixel is started.

At step 807, the color/monochrome determination unit 106 increments (+1) the value of the y counter.

At step 808, the color/monochrome determination unit 106 determines whether the determination processing of all the pixels (Y pixels) in the sub scan direction has been completed. In the case where the determination processing of all the pixels in the sub scan direction has been completed, the processing proceeds to step 809. On the other hand, in the case where there exists a pixel(s) in the sub scan direction on which the processing has not been performed yet, the processing returns to step 802 and the determination processing of the next pixel in the sub scan direction is started.

At step 809, the color/monochrome determination unit 106 determines whether the count value of the col counter is equal to or greater than a threshold value β determined in advance. An arbitrary value is also set to the threshold value β. For example, in the case where it is desired to determine that the page is color image data on a condition that there is one and only one color pixel, it is sufficient to set, for example, β=1. It is also assumed that the value of the threshold value β is held in the HDD 103 etc. as in the case of the above-described threshold value α. In the case where it is determined that the count value of the col counter is equal to or greater than the threshold value β, the processing proceeds to step 810. On the other hand, in the case where it is determined that the count value of the col counter is less than the threshold value β, the processing proceeds to step 811.

At step 810, the color/monochrome determination unit 106 determines that the processing-target page is color image data and outputs the determination results.

At step 811, the color/monochrome determination unit 106 determines that the processing-target page includes monochrome image data and outputs the determination results.

The above is the contents of the second color/monochrome determination processing (CMYK color/monochrome determination processing).

Subsequently, the first color/monochrome determination processing is explained.

Figure 9:
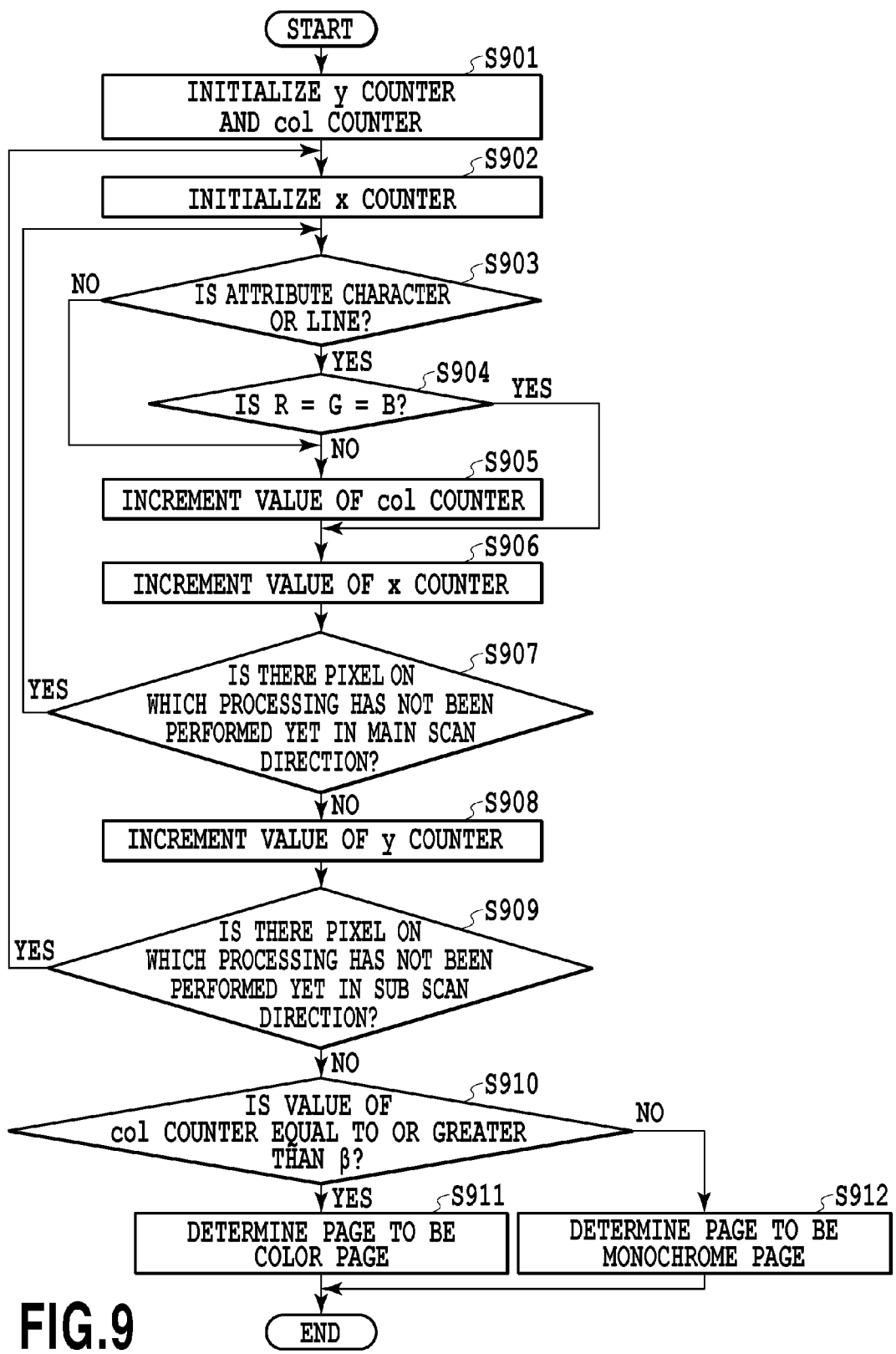
FIG. 9 is a flowchart showing a flow of first color/monochrome determination processing (RGB color/monochrome determination processing)

FIG. 9 is a flowchart showing a flow of the first color/monochrome determination processing (RGB color/monochrome determination processing). Here, differences from the above-described second color/monochrome determination processing are explained mainly.

At step 901, the color/monochrome determination unit 106 initializes the y counter for counting the pixels in the sub scan direction and the col counter for counting the color pixels, respectively.

At step 902, the color/monochrome determination unit 106 initializes the x counter for counting the pixels in the main scan direction.

At step 903, the color/monochrome determination unit 106 determines whether or not the processing-target pixel is a pixel that belongs to the object of a character or a line for which gray compensation color conversion is to be performed. In the case where the results of the determination indicate that the pixel is a pixel that belongs to the object of a character or a line, the processing proceeds to step 904. On the other hand, in the case where the pixel is a pixel that belongs to the object of an attribute other than a character and a line, the processing proceeds to step 905.

At step 904, the color/monochrome determination unit 106 determines whether or not the tone level values of the processing-target pixel are R=G=B. In the case where the results of the determination indicate that R=G=B, the processing proceeds to step 906. On the other hand, in the case where R=G=B does not hold, the processing proceeds to step 905.

The color/monochrome determination unit 106 increments (+1) the value of the col counter at step 905, and increments (+1) the value of the x counter at step 906.

The processing at step 903 described above is processing to increment the value of the col counter because gray is represented by CMYK in the cases where the object is other than a character and a line, and the processing at step 904 described above is processing to increment the value of the x counter because gray is represented by the K monochrome in the case where the object is a character or a line, respectively.

The processing at step 907 to step 912 corresponds to the processing at step 806 to step 811, respectively, in the flow in FIG. 8 described above and there is no difference between the processing, and therefore, explanation is omitted.

The above is the contents of the first color/monochrome determination processing (RGB color/monochrome determination processing).

According to the present embodiment, gray compensation color conversion is performed on the pixel determined to be included in a character or a line by the RGB based color conversion processing and non-gray compensation color conversion is performed on the pixel determined to be included in a graphic or an image, and an RGB image is converted into a CMYK image. Then, prior to the RGB based color conversion processing, the RGB color/monochrome determination processing is performed and the printer unit 107 is activated in a predetermined operation mode in accordance with the determination results. By activating the printer unit 107 in an early stage as described above, circumstances in which printing cannot be started because the preparation for the printer unit 107 is not completed yet although the necessary image processing including halftone processing etc. has already been completed are prevented from occurring (particularly, in the case of color printing).

In addition, the edge determination processing is performed on the CMYK image that is obtained by the RGB based color conversion processing and in the case where the area determined to be an edge is gray, the area is converted into the K monochrome (RGB based K monochromatization processing). Then, in the case where a color image has changed into a monochrome image by the RGB based K monochromatization processing, the printer unit 107 is controlled so as to activate in the monochrome mode in the next and subsequent printing processing. By appropriately controlling the printer unit 107 so as to operate in the color mode or in the monochrome mode in this manner, the parts in the color printer are suppressed from being worn and it is possible to appropriately set the maintenance timing.

Depending on the sequence of the printing processing, there is a case where it is not possible to reduce the time from when the printing button is pressed down until printed matter is output (printing processing time) even by activating the printer unit 107 after the first color/monochrome determination processing. Consequently, it may also be possible to determine whether the sequence of the printing processing is a sequence in which it is possible to reduce the printing processing time by activating the printer unit 107 immediately in accordance with the results of the first color/monochrome determination processing, and then to activate the printer unit 107 earlier only in the case where it is determined that the printing processing time can be reduced. In the case where it is determined that the printing processing time cannot be reduced, it is sufficient to activate the printer unit 107 in accordance with the determination results after the second color/monochrome determination processing. By performing the sequence determination processing such as this, it is made possible to perform the printing processing without waste in accordance with whether the image data is color or monochrome from the start.

Second Embodiment

Next, an aspect is explained as a second embodiment, in which after the color space (e.g., RGB) of input image data is converted into the color space (e.g., CMYK) of the printing apparatus 10, rendering of the bitmap data in the CMYK color space is performed in the PDL interpretation unit. Explanation of the portions in common to those of the first embodiment is omitted or simplified and in the following, different points are explained mainly.

Figure 10:
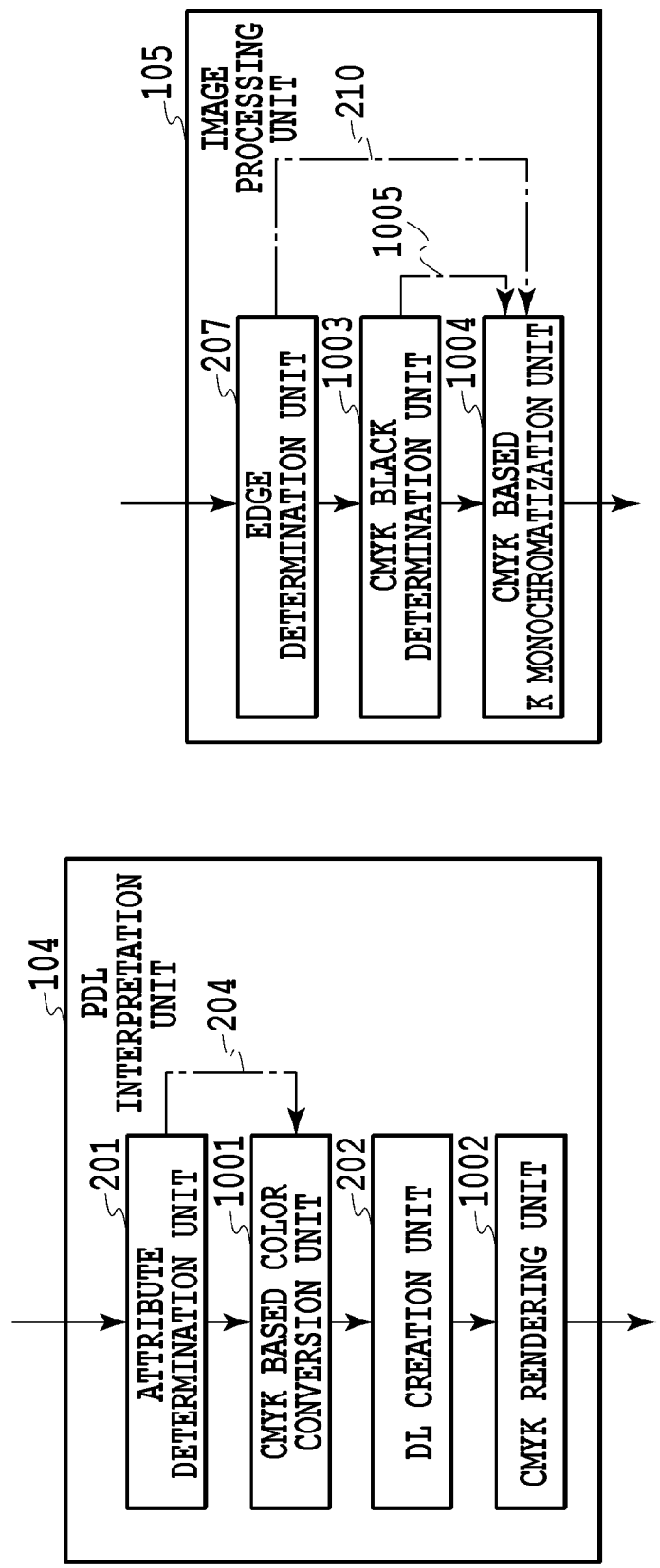
FIGS. 10A and 10B are function block diagrams showing an internal configuration of a PDL interpretation unit and an internal configuration of an image processing unit, respectively, in the case where a rendering color space is CMYK according to a second embodiment.

FIGS. 10A and 10B are function block diagrams showing an internal configuration of the PDL interpretation unit 104 and an internal configuration of the image processing unit 105, respectively, in the case where a bitmap image whose output is in the CMYK color space (rendering color space is the CMYK color space) is generated. In the present embodiment, PDL data whose rendering is performed in the CMYK color space and which is described in the page description language (PDL), such as, for example, PS (PostScript: the registered trademark of Adobe Systems Incorporated) and PDF (Portable Document format), is input.

The PDL interpretation unit 104 according to the present embodiment includes the attribute determination unit 201, a CMYK based color conversion unit 1001, the DL creation unit 202, and a CMYK rendering unit 1002. The image processing unit 105 includes the edge determination unit 207, a CMYK black determination unit 1003, and a CMYK based K monochromatization unit 1004. The same numbers are attached to the same function units as those in FIG. 2.

First, the PDL interpretation unit 104 shown in FIG. 10A is explained.

The attribute determination unit 201 determines the attribute of an object as in the first embodiment. In the present embodiment, the object attribute signal 204, which is the determination results, is output to the CMYK based color conversion unit 1001.

The CMYK based color conversion unit 1001 performs processing to convert the color space of input print data into the CMYK color space of the printer unit 107 in accordance with the object attribute signal 204. In the case of the kinds of PDL to which the present embodiment is applied, the print data is input in a variety of color spaces, such as RGB, CMYK, and Gray. Each color space is subjected to the processing as follows and print data is output in the CMYK color space.

1) In the Case where the Color Space of Input Print Data is RGB

In the case where the attribute of the object is a character or a line, gray compensation color conversion is performed and in the case where the attribute is other than a character or a line (i.e., a graphic or an image), non-gray compensation color conversion is performed.

2) In the Case where the Color Space of Input Print Data is CMYK

Regardless of the attribute of the object, the input CMYK values are output as they are (color conversion processing is not performed).

3) In the Case where the Color Space of Input Print Data is Gray

Regardless of the attribute of the object, the input Gray value is taken to be the value of K and output after setting C=M=Y=0.

The processing in 1) to 3) described above is just an example and only the capability of conversion into the CMYK color space, which is the output color space of a printer, is necessary.

The DL creation unit 202 interprets PDL data for each page and creates a DL as in the first embodiment. As described above, the PDL data in the present embodiment is data described in the PDL language (e.g., PS or PDF) that performs rendering in the CMYK color space. The created DL is output to the CMYK rendering unit 1002.

The CMYK rendering unit 1002 generates bitmap data in the CMYK color space based on the DL received from the DL creation unit 202.

Next, the image processing unit 105 shown in FIG. 10B is explained.

The edge determination unit 207 performs processing (edge determination processing) to analyze the bitmap data in the CMYK color space, which is generated in the CMYK rendering unit 1002, and to determine an edge included in the bitmap image. The results of the determination are output as the edge determination signal 210. In the case of the present embodiment, by converting the color space into the color space of CMYK that is the same as the colors of the toner that is used for image formation in the printer unit 107, it is made possible to create a design in common in accordance with the characteristics of the printer unit 107 without depending on the kinds of PDL.

The CMYK black determination unit 1003 determines whether or not each pixel is black (K=255), which is an achromatic color, from the bitmap data in the CMYK color space. The results of the determination are output as a black determination signal 1005. The RGB gray determination unit 205 in the first embodiment determines whether or not a pixel is gray (achromatic color), but in the present embodiment, whether or not a pixel is black of K=255 is determined. The reason is that in the case of the kinds of PDL to which the present embodiment is applied, CMYK data may be input as input print data and C=M=Y does not necessarily mean gray (achromatic color). The achromatic color in CMYK data differs depending on an output printer and it is not possible to determine uniquely, and therefore, only black of K=255 that can be determined uniquely is determined.

The CMYK based K monochromatization unit 1004 performs processing (CMYK based K monochromatization processing) to convert a CMYK image signal into an image signal having the value of only K based on the edge determination signal 210, which is the output signal of the edge determination unit 207, and the black determination signal 1005, which is the output signal of the CMYK black determination unit 1003. In other words, a pixel determined to be an edge and also determined to be gray is converted into an image signal having the value of only K. The K monochromatization processing in the CMYK based K monochromatization unit 1004 may not be processing that is applied to all the pixels in a bitmap image. For example, the K monochromatization processing may be processing that is applied only to pixels that are not determined to be a character or a line.

As explained also in the first embodiment, the image processing unit 105 also includes the function to perform the general image processing, such as tone level correction processing and dither processing, and the image processing is performed in accordance with necessity.

Figure 11:
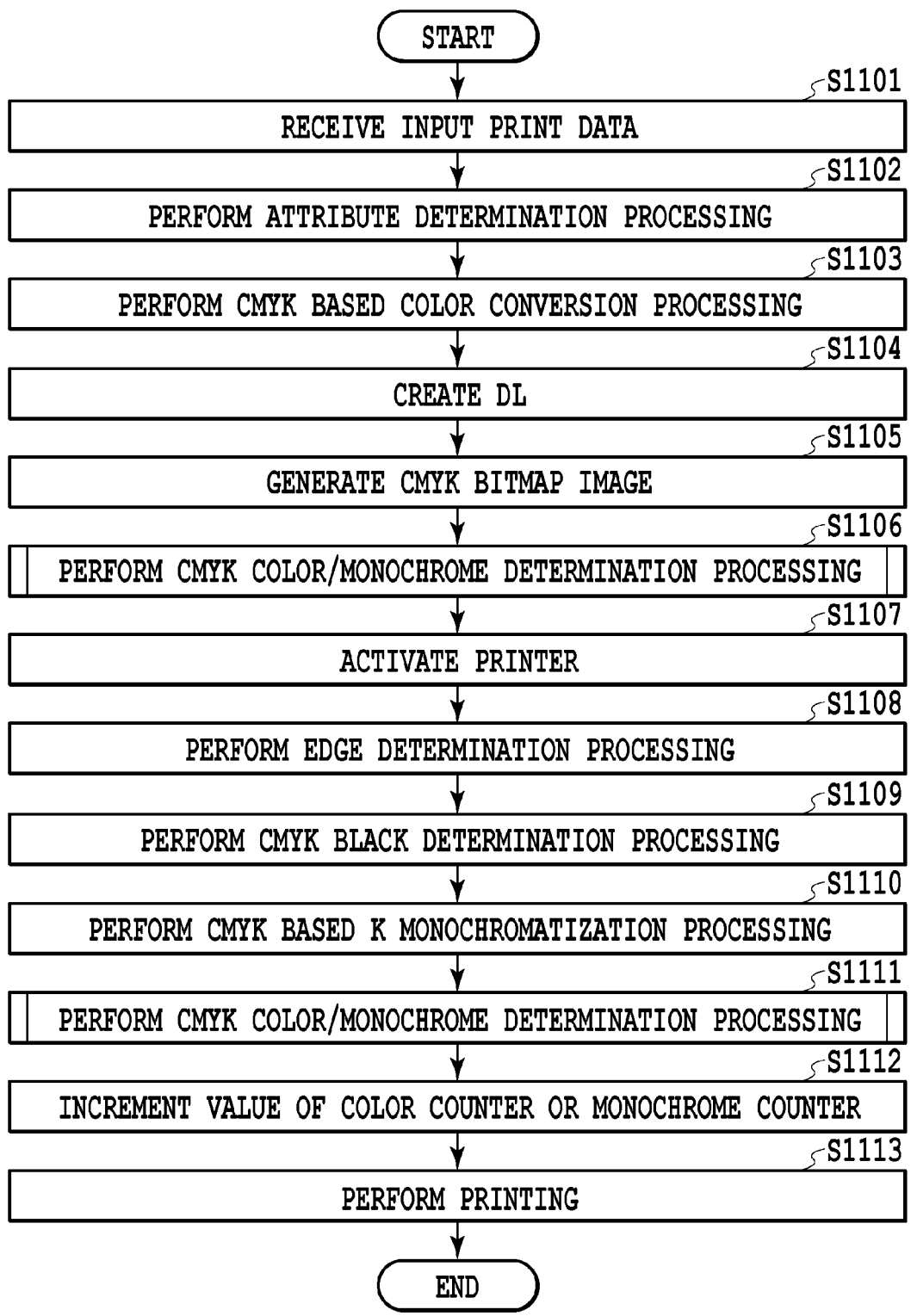
FIG. 11 is a flowchart showing a flow of printing processing in a printing apparatus in the case where the rendering color space is the CMYK according to the second embodiment.

FIG. 11 is a flowchart showing a flow of the printing processing in the printing apparatus 100 in the case where rendering is performed in the RGB color space according to the present embodiment.

At step 1101, the printing apparatus 100 receives print data from a PC etc. The received print data is sent to the PDL interpretation unit 104 and the following processing at each of step 1102 to step 1105 is performed therein.

At step 1102, the attribute determination unit 201 of the PDL interpretation unit 104 determines the attribute (character, line, graphic, image) of an object included in input print data. The object attribute signal 204 as the determination results is output to the CMYK based color conversion unit 1001.

At step 1103, the CMYK based color conversion unit 1001 performs processing (CMYK based color conversion processing) to convert the color space of the input print data into the CMYK color space of the printer unit 107 in accordance with the object attribute signal 204, which is the results of the attribute determination processing at step 1102. Details of the processing are as described previously.

At step 1104, the DL creation unit 202 converts the commands of the PDL data into respective drawing commands and creates a DL. The created DL is sent to the CMYK rendering unit 1002.

At step 1105, the CMYK rendering unit 1002 generates a bitmap image in the CMYK color space for each page based on the DL created at step 1104. The data of the generated bitmap image (hereinafter, CMYK bitmap data) is saved in the HDD 103 etc.

At step 1106, the color/monochrome determination unit 106 analyzes the CMYK bitmap data generated at step 1105 and performs color/monochrome determination processing (first color/monochrome determination processing) for the CMYK color space for each page. Then, the document management data including color/monochrome information for each page is held in the HDD 103.

At step 1107, the CPU 101 activates the printer unit 107 in a predetermined operation mode in accordance with the results of the first color/monochrome determination processing. The CMYK bitmap data on which the first color/monochrome determination processing has been performed is sent to the image processing unit 105.

In the image processing unit 105, the following processing at each of step 1108 to 1110 is performed.

At step 1108, the edge determination unit 207 analyzes the CMYK bitmap data generated at step 1105 and determines an edge included in the CMYK bitmap data. The details of the processing are as those explained at step 309 in the flow in FIG. 3 of the first embodiment. The results of the determination are output as the edge determination signal 210 and used in the CMYK based K monochromatization unit 1004, to be described later.

At step 1109, the CMYK black determination unit 1003 determines a black portion whose pixel value is K=255 from the bitmap data in the CMYK color space. Information for specifying a pixel determined to be black (black pixel) is output as the black determination signal 1005 and used in the CMYK based K monochromatization unit 1004.

Figure 12:
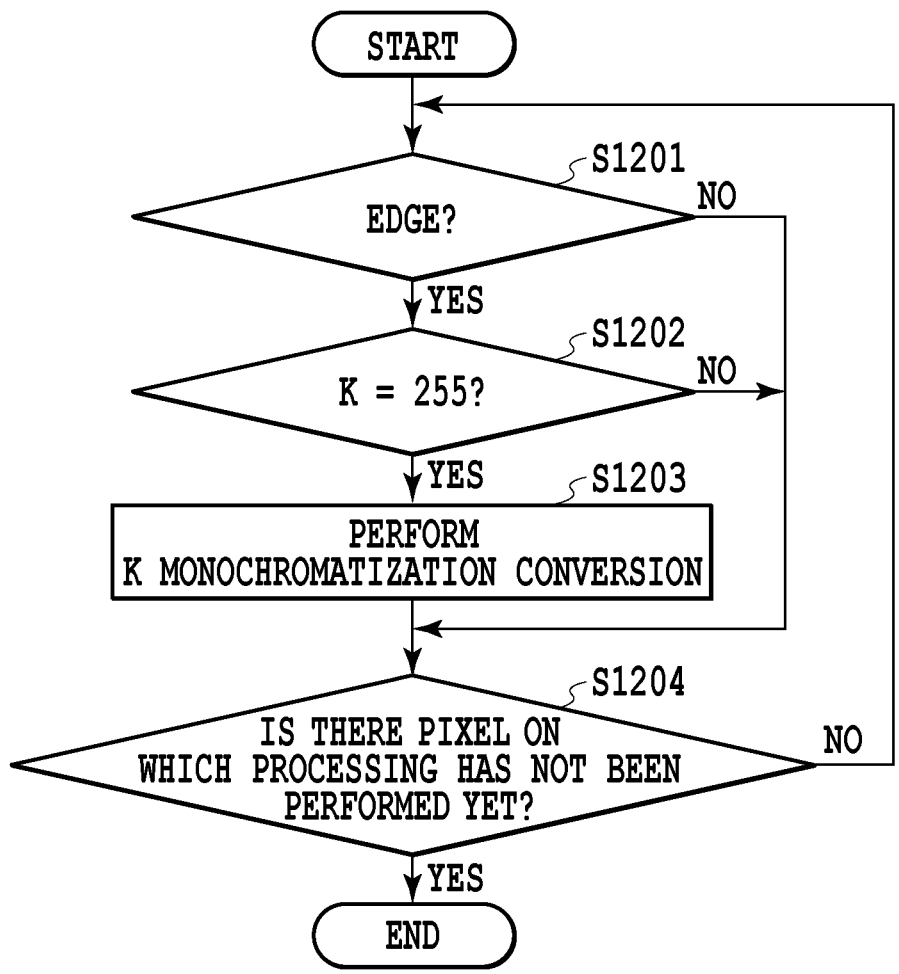
FIG. 12 is a flowchart showing details of CMYK based K monochromatization processing according to the second embodiment.

At step 1110, the CMYK based K monochromatization unit 1004 performs processing (CMYK based K monochromatization processing) to convert the CMYK image signal into an image signal having the value of only K by using the edge determination signal 210 and the black determination signal 1005. Specifically, in the case where the pixel of interest is an edge pixel and is also a black pixel of K=255, processing to turn C, M, and Y into 0 is performed while leaving K=255 as it is. FIG. 12 is a flowchart showing details of the CMYK based K monochromatization processing.

At step 1201, the CMYK based K monochromatization unit 1004 determines whether or not the pixel of interest is an edge pixel based on the edge determination signal 210 received from the edge determination unit 207. In the case where the pixel of interest is an edge pixel, the processing proceeds to step 1202. On the other hand, in the case where the pixel of interest is not an edge pixel, the processing proceeds to step 1204.

At step 1202, the CMYK based K monochromatization unit 1004 determines whether or not the pixel of interest is a black pixel of K=255 based on the black determination signal 1005 received from the CMYK black determination unit 1003. In the case where the pixel of interest is a black pixel, the processing proceeds to step 1203. On the other hand, in the case where the pixel of interest is not a black pixel, the processing proceeds to step 1204. In the case where the pixel of interest is not an edge pixel or in the case where the pixel of interest is not a black pixel as described above, the K monochromatization conversion processing is skipped as a result.

At step 1203, the CMYK based K monochromatization unit 1004 performs K monochromatization conversion processing on the pixel of interest that is an edge pixel and also a black pixel. Specifically, the CMYK based K monochromatization unit 1004 performs K monochromatization conversion to convert C, M, and Y into 0 while leaving K=255 as it is in the CMYK color space. The black edge portion is a character or a line in many cases, and therefore, in the case where a deviation in registration etc. occurs in the printer unit 107, the toner of each color of CMY appears and the black line may be colored. This will mar the appearance. Due to the K monochromatization for a black character or line at this step, the above-described coloring is avoided and it is possible to improve the appearance.

At step 1204, the CMYK based K monochromatization unit 1004 determines whether or not there is a pixel(s) on which the processing has not been performed yet within the CMYK bitmap data. In the case where there is a pixel(s) on which the processing has not been performed yet, the processing returns to step 1201 and the processing is continued by taking the next pixel to be the pixel of interest. On the other hand, in the case where the processing has been completed on all the pixels, the present processing is exited.

The above is the contents of the CMYK based K monochromatization processing.

Explanation is returned to the flowchart in FIG. 11.

At step 111, the color/monochrome determination unit 106 analyzes the bitmap data in the CMYK color space, which is the output image data on which the image processing has been performed in the image processing unit 105, and determines whether each page is a color page (second color/monochrome determination processing). The results of the second color/monochrome determination processing are reflected in the document management data that is generated in the first color/monochrome determination processing (step 1106) and held.

At step 1112, the CPU 101 increments the value of the color counter for counting color printed pages or the monochrome counter for counting monochrome printed pages in accordance with the results of the second color/monochrome determination processing. The results of counting are displayed on the display unit 108.

At step 1113, the CPU 101 gives instructions to print output image data to the printer unit 107. Upon receipt of the instructions, the printer unit 107 forms an image on a printing medium such as paper and outputs printed matter.

The above is the flow of the printing processing in the printing apparatus 100 according to the present embodiment.

According to the present embodiment, by the CMYK based color conversion processing, color conversion processing in accordance with the results of the attribute determination processing and the color space of the input print data is performed and an RGB image is converted into a CMYK image. Then, the CMYK color/monochrome determination processing (first color/monochrome determination) is performed on the CMYK image obtained by the CMYK based color conversion processing and the printer is caused to activate in a predetermined operation mode in accordance with the determination results. As described above, in the present embodiment also, the printer unit 107 is activated in an early stage, and therefore, it is possible to prevent the occurrence of circumstances in which although all the necessary image processing has already been completed, printing cannot be started because the printer unit 107 is not made ready.

Further, in the present embodiment, the area of an edge pixel and also a black pixel of the obtained CMYK image is converted into K monochrome. In the case where a color image is changed into a monochrome image due to the K monochromatization processing, the printer unit 107 is controlled so as to activate in the monochrome mode in the next and subsequent printing processing. In other words, as in the first embodiment, it is possible to appropriately control the printer unit 107 so as to operate in the color mode or in the monochrome mode, and therefore, the parts of the color printer are suppressed from being worn and it is possible to appropriately set the maintenance timing.

The configuration of the PDL interpretation unit 104 and the image processing unit 105 may be a combination of the configuration explained in the first embodiment and the configuration explained in the present embodiment. In this case, it is sufficient to analyze the input print data received from the PC and to switch programs in accordance with the kinds of PDL. In the case where the configuration such as this is adopted, it is also made possible to use the same circuit because the edge determination unit 207 analyzes the bitmap data in the CMYK color space both in the configuration in FIG. 2 and in the configuration in FIG. 10, and therefore, it is made possible to reduce the circuit scale.

In the first embodiment, it is supposed that the color space of input print data is only the RGB color space and in the second embodiment, it is supposed that the color space of input print data is only the CMYK color space. However, in the case where the input print data is PDL data that is described in, for example, PostScript described previously, there may be a case where objects in different color spaces are intermingled within the same page. Consequently, an aspect is explained as a third embodiment and a fourth embodiment, in which whether or not K monochromatization is necessary is determined for each of objects in different color spaces in the case where objects in different color spaces may be intermingled within the same page of input print data. Explanation of the portions in common to those of the first and second embodiments is omitted or simplified and in the following, different points are explained mainly.

Third Embodiment

First, an aspect in which rendering is performed in the RGB color space and an RGB bitmap image is generated is explained as the third embodiment.

Figure 13:
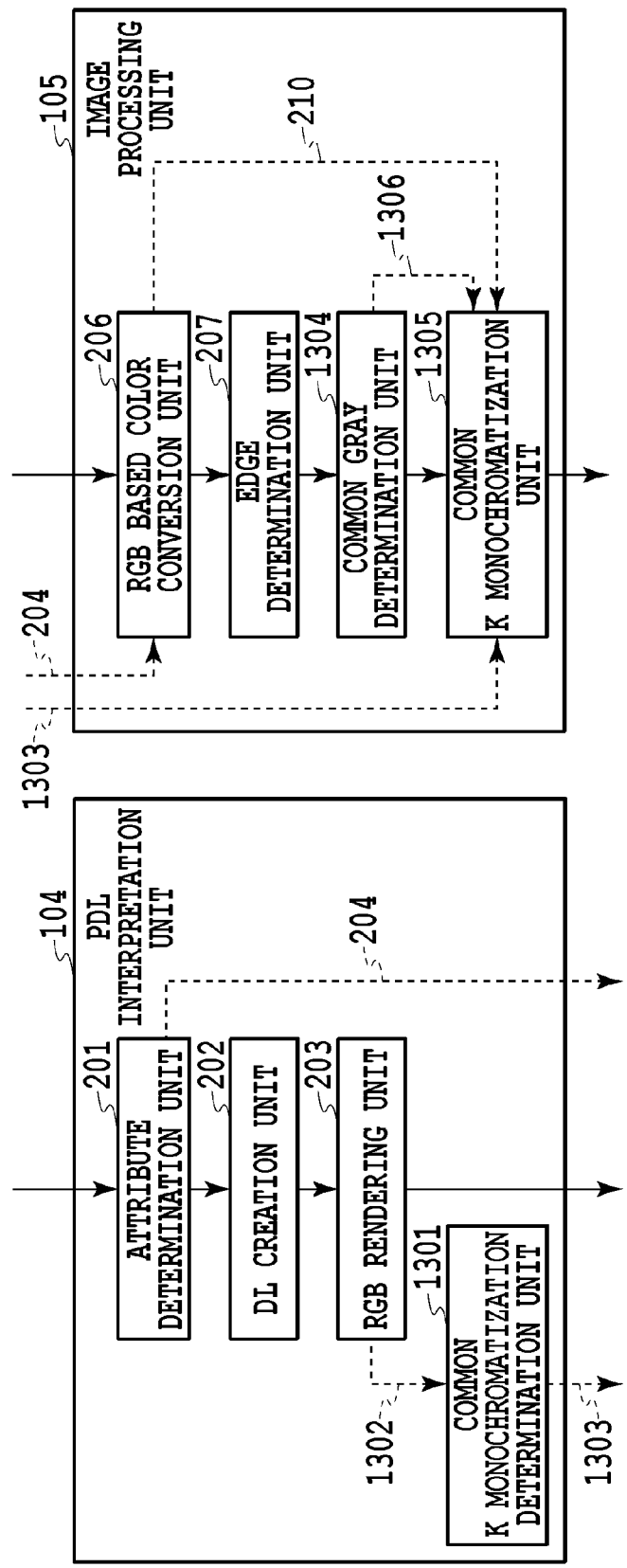
FIGS. 13A and 13B are function block diagrams showing an internal configuration of a PDL interpretation unit and an internal configuration of an image processing unit, respectively, in the case where a rendering color space is RGB according to a third embodiment.

FIGS. 13A and 13B are function block diagrams showing an internal configuration of the PDL interpretation unit 104 and an internal configuration of the image processing unit 105, respectively, in the case where a bitmap image is generated in the RGB color space according to the present embodiment. The PDL interpretation unit 104 includes the attribute determination unit 201, the DL creation unit 202, the RGB rendering unit 203, and a common K monochromatization determination unit 1301. The image processing unit 105 includes the RGB based color conversion unit 206, the edge determination unit 207, a common gray determination unit 1304, and a common K monochromatization unit 1305. In the configuration shown in FIG. 13B, it is made possible to make common the processing module in the case where the rendering color space is the CMYK color space and the processing module in the case where the rendering color space is the RGB color space and then the RGB color space is converted into the CMYK color space. As a result of this, the difference between the processing modules due to the difference in the rendering color space is suppressed to a minimum, and therefore, it is possible to implement a reduction in costs by making common the hardware and software. The same numbers are attached to the same function units as those in FIG. 2 and FIG. 10.

First, the PDL interpretation unit 104 shown in FIG. 13A is explained. The attribute determination unit 201 and the DL creation unit 202 are the same as those in the case of the first embodiment, and therefore, explanation is omitted and the RGB rendering unit 203 that operates differently and the common K monochromatization determination unit 1301 are explained.

The RGB rendering unit 203 generates bitmap data in the RGB color space whose resolution is matched with the resolution of the printer unit 107 based on the DL created by the DL creation unit 202. Further, the RGB rendering unit 203 of the present embodiment outputs information on the color space (RGB) in which rendering has been performed to the common K monochromatization determination unit 1301 as a rendering color space signal 1302.

Figure 14:
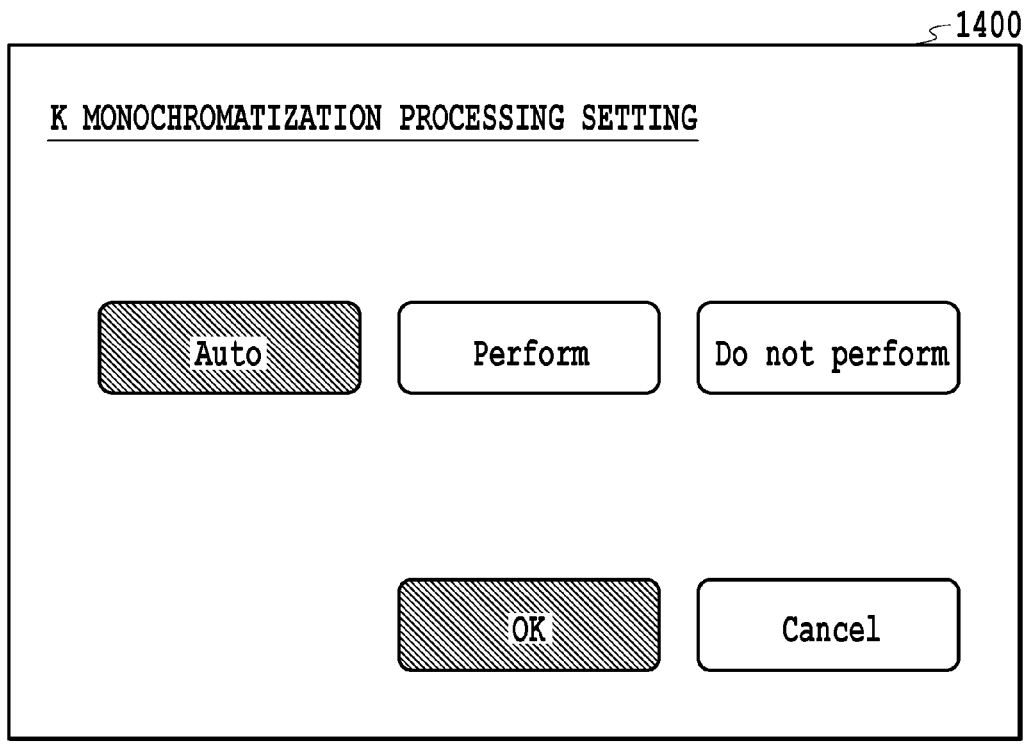
FIG. 14 is a diagram showing an example of a K monochromatization processing setting screen.

The common K monochromatization determination unit 1301 determines whether or not K monochromatization is performed based on the rendering color space signal 1302 from the RGB rendering unit 203 and the contents of the setting in the K monochromatization processing setting. FIG. 14 is a diagram showing an example of a setting screen for the K monochromatization processing setting. On a setting screen 1400 shown in FIG. 14, three kinds of selection buttons, i.e., "Auto", "Perform", and "Do not perform" buttons with which a user can select one of three alternatives, and in the case where a user selects one of the alternatives and presses down an OK button, the selected contents are set. In this case, on a condition that the "Auto" button is pressed down, whether or not K monochromatization processing is performed is determined based on the rendering color space signal 1302. The "Perform" and "Do not perform" buttons are prepared for a user to specify whether or not K monochromatization is performed by the user him/herself in the case where the user is not satisfied with the determination results obtained by "Auto". The results of the determination of whether or not K monochromatization is performed are output to the common K monochromatization unit 1305 as a K monochromatization determination signal 1303.

Next, the image processing unit 105 shown in FIG. 13B is explained. The RGB based color conversion unit 206 and the edge determination unit 207 are the same as those in the case of the first embodiment, and therefore, explanation is omitted and the common gray determination unit 1304 and the common K monochromatization unit 1305 that operate differently are explained.

The common gray determination unit 1304 determines whether or not each pixel is gray (R=G=B), which is an achromatic color, from bitmap data in the CMYK color space. The determination results are output to the common K monochromatization unit 1305 as a gray determination signal 1306. Here, a method of determining whether each pixel in the bitmap data in the CMYK color space is R=G=B is explained. In the case where the device standard color conversion table is used, the signal that takes one of 0 to 255 on a condition that R=G=B takes values of C, M, Y, and K, respectively, as shown in FIG. 5. In other words, in the case of the CMYK values as shown in FIG. 5, R=G=B holds, and therefore, it is made possible to determine whether a pixel is gray, which is an achromatic color, from a combination of CMYK values. For example, in the case where a certain pixel has values of (C, M, Y, K)=(49, 98, 127, 255), R=G=B=255. Consequently, for the pixel, the gray determination signal 1306 having a value (e.g., "1") indicating that the pixel is gray is output as a result. The example described here is a method of predicting gray from the device standard color conversion table, and therefore, it is possible to apply the method only in the case where the device standard color conversion table is used. Then, in the case where rendering is performed in the RGB color space, the device standard color conversion table is used at all times, and therefore, it is possible to apply the gray determination method. Further, it is made possible to deal with variations etc. in the printer by performing the gray determination described above in a fuzzy manner by giving a width (error) to each value of CMYK. The common gray determination may not be determination that is applied to all the pixels in the bitmap image. For example, the common gray determination may be determination that is applied only to the pixels not determined to be a character or a line. This also applies to other embodiments.

The common K monochromatization unit 1305 performs processing (common K monochromatization processing) to convert a CMYK image signal into an image signal having only the value of K based on the K monochromatization determination signal 1303, the edge determination signal 210, and the gray determination signal 1306 described above. In other words, the common K monochromatization unit 1305 converts a pixel determined to be an edge and also determined to be gray into an image signal having only the value of K. The K monochromatization processing by the common K monochromatization unit 1305 may not be processing that is applied to all the pixels in a bitmap image. For example, the K monochromatization processing may be processing that is applied only to the pixels not determined to be a character or a line. This also applies to other embodiments.

As explained in the first and second embodiments, the image processing unit 105 also includes the function of the general image processing, such as tone level correction processing and dither processing, and the image processing is performed in accordance with necessity.

Figure 15:
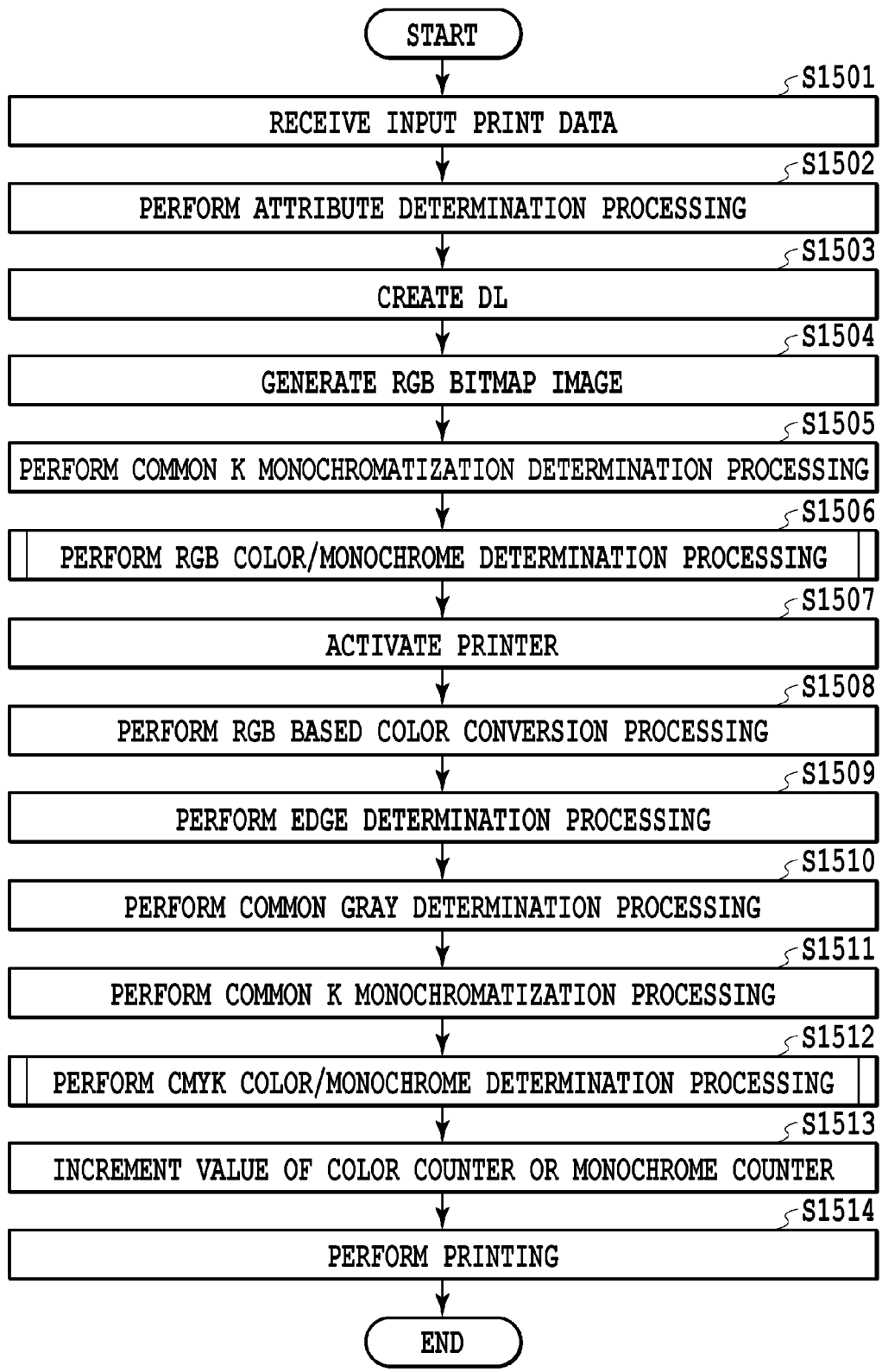
FIG. 15 is a flowchart showing a flow of printing processing in a printing apparatus in the case where the rendering color space is the RGB according to the third embodiment.

FIG. 15 is a flowchart showing a flow of the printing processing in the printing apparatus 100 in the case where rendering is performed in the RGB color space according to the present embodiment. In the following, different points from those in the flow in FIG. 3 in the first embodiment are explained mainly.

Step 1501 to step 1504 correspond to step 301 to step 304, respectively, in the flow in FIG. 3, and therefore, explanation is omitted.

In the case where RGB bitmap data is generated at step 1504, the common K monochromatization determination unit 1301 determines whether or not K monochromatization is necessary based on the rendering color space signal 1302 indicating the color space at the time of rendering and the contents of the K monochromatization processing setting at step 1505. Then, the common K monochromatization determination unit 1301 generates the K monochromatization determination signal 1303 described above based on the determination results. Specifically, in the case where the "Auto" button or the "Perform" button has been selected on the K monochromatization processing setting screen 1400 (see FIG. 14) described previously, K monochromatization is determined to be necessary and the K monochromatization determination signal 1303 of "ON" is generated. On the other hand, in the case where "Do not perform" button has been selected, it is determined that K monochromatization is not necessary and the common K monochromatization determination unit 1301 of "OFF" is generated.

After the common K monochromatization determination processing, the RGB color/monochrome determination processing (see step 305 in FIG. 3) is performed at step 1506 and the printer is activated in a predetermined operation mode at step 1507. After the printer activates, the processing at each of step 1508 and subsequent steps is performed by the image processing unit 105.

At step 1508, the RGB based color conversion unit 206 performs processing to convert RGB data into CMYK data in accordance with the object attribute signal 204. In this case, RGB rendering is performed and the device standard color conversion table is used for color conversion at all times, and therefore, processing to generate a signal (see step 1703, to be described later) indicating whether the device standard color conversion table is used, which is performed in a fourth embodiment, to be described later, is not performed.

After the edge determination processing (for details, see step 309 in the flow in FIG. 3) at step 1509, the common gray determination unit 1304 determines whether or not each pixel of the bitmap data in the CMYK color space is gray at step 1510. In the case where the results of the determination indicate that the pixel is a gray pixel of R=G=B, the gray determination signal 1306 of "1 (achromatic color)" is output and in the case where the pixel is not a gray pixel, the gray determination signal 1306 of "0 (chromatic color)" is output.

At step 1511, the common K monochromatization unit 1305 performs processing (common K monochromatization processing) to convert the specific CMYK values into bitmap data of the CMYK values of the K monochrome by using the K monochromatization determination signal 1303, the edge determination signal 210, and the gray determination signal 1306. Specifically, the CMYK values of the pixel, which is a gray pixel, an edge pixel, and a K monochromatization ON pixel, are converted into the CMYK values of the K monochrome.

Subsequent step 1512 to step 1514 correspond to step 311 to step 313, respectively, in the flow in FIG. 3 of the first embodiment, and therefore, explanation is omitted.

The above is the flow of the printing processing in the printing apparatus 100 in the case where the rendering color space is the RGB color space according to the present embodiment.

Fourth Embodiment

Next, an aspect in which the rendering color space is the CMYK color space and a CMYK bitmap image is generated is explained as the fourth embodiment.

Figure 16:
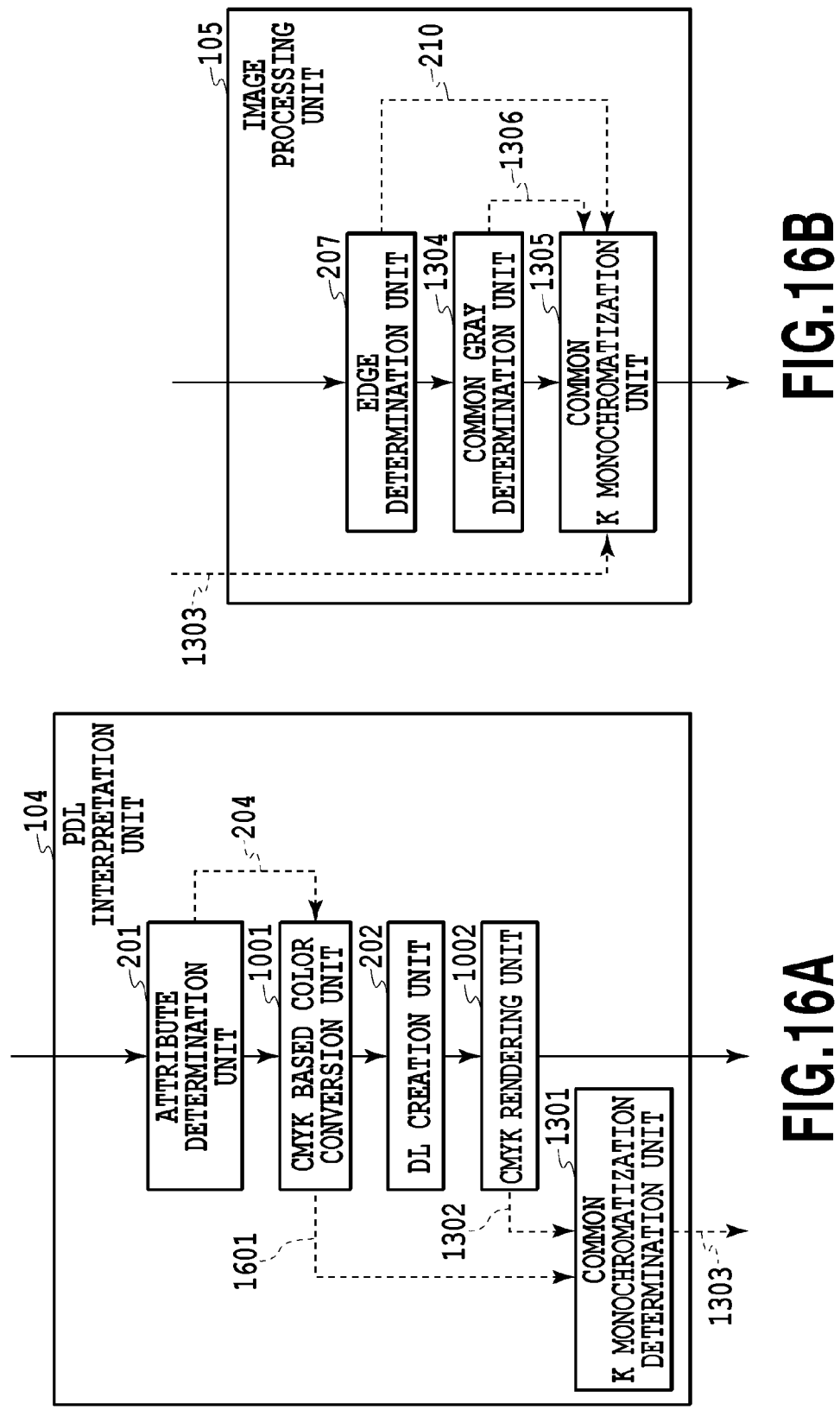
FIGS. 16A and 16B are function block diagrams showing an internal configuration of a PDL interpretation unit and an internal configuration of an image processing unit, respectively, in the case where a rendering color space is CMYK according to a fourth embodiment.

FIGS. 16A and 16B are function block diagrams showing an internal configuration of the PDL interpretation unit 104 and an internal configuration of the image processing unit 105, respectively, in the case where a bitmap image is generated in the CMYK color space according to the present embodiment. The PDL interpretation unit 104 includes the attribute determination unit 201, the CMYK based color conversion unit 1001, the DL creation unit 202, the CMYK rendering unit 1002, and the common K monochromatization determination unit 1301. The image processing unit 105 includes the edge determination unit 207, the common gray determination unit 1304, and the common K monochromatization unit 1305. As in FIG. 13, also in the configuration shown in FIG. 16, it is made possible to make common the processing module in the case where the rendering color space is the CMYK color space and the processing module in the case where the rendering color space is the RGB color space and then the RGB color space is converted into the CMYK color space in the image processing unit 105. The same numbers are attached to the same function units as those in FIG. 2, FIG. 10, and FIG. 13.

First, the PDL interpretation unit 104 shown in FIG. 16A is explained. The attribute determination unit 201, the DL creation unit 202, and the CMYK rendering unit 1002 are the same as those in the case of the first embodiment and the second embodiment, and therefore, explanation is omitted and the CMYK based color conversion unit 1001 and the common K monochromatization determination unit 1301 that operate differently are explained.

The CMYK based color conversion unit 1001 performs color conversion from a variety of color spaces into the CMYK color space. Further, the CMYK based color conversion unit 1001 generates a nonstandard signal 1601 indicating whether a non-device-standard color conversion table is used in the color conversion processing and outputs the nonstandard signal 1601 to the common K monochromatization determination unit 1301. In the case where the non-device-standard color conversion table is used, the nonstandard signal 1601 is "1=ON", and in the case where the device standard color conversion table is used, the nonstandard signal 1601 is "0=OFF".

The CMYK rendering unit 1002 generates bitmap data in the CMYK color space whose resolution is matched with that of the printer unit 107 based on the DL created by the DL creation unit 202. Further, the CMYK rendering unit 1002 of the present embodiment outputs information on the color space (CMYK) in which rendering has been performed to the common K monochromatization determination unit 1301 as the rendering color space signal 1302.

The common K monochromatization determination unit 1301 determines whether or not K monochromatization is performed based on the rendering color space signal 1302 from the CMYK rendering unit 1002, the nonstandard signal 1601 from the CMYK based color conversion unit 1001, and the setting contents in the K monochromatization processing setting described above. Then, the K monochromatization determination signal 1303 is output to the common K monochromatization unit 1305 as the determination results.

As to each element constituting the image processing unit 105 shown in FIG. 16B, the edge determination unit 207 is the same as that in the case of the first embodiment and the second embodiment, and the common gray determination unit 1304 and the common K monochromatization unit 1305 are those as described in the third embodiment, and therefore, explanation is omitted. The present embodiment is the same as the other embodiments in that the image processing unit 105 includes the function of the general image processing, such as the tone level correction processing and the dither processing, and in that the image processing is performed in accordance with necessity.

Figure 17:
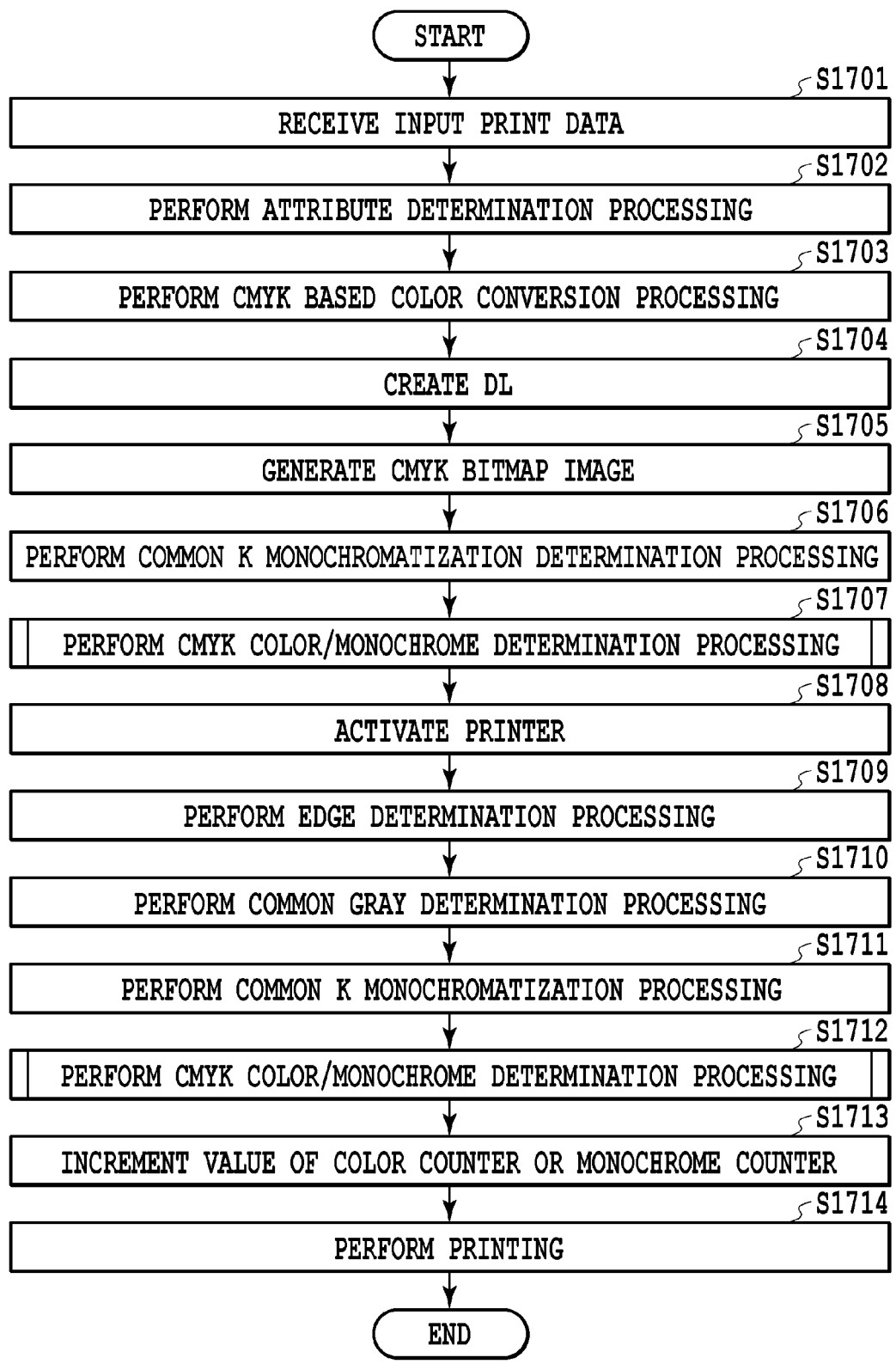
FIG. 17 is a flowchart showing a flow of printing processing in a printing apparatus in the case where the rendering color space is the CMYK according to the fourth embodiment.

FIG. 17 is a flowchart showing a flow of the printing processing in the printing apparatus 100 in the case where rendering is performed in the CMYK color space according to the present embodiment. In the following, different points from the flow in FIG. 11 in the second embodiment are explained mainly.

Step 1701 to step 1705 correspond to step 1101 to step 1105, respectively, in the flow in FIG. 11. These steps are the same and here, the color conversion processing from a variety of color spaces into the CMYK color space at step 1703 is explained in detail with reference to FIGS. 18A to 18C.

Figure 18A:
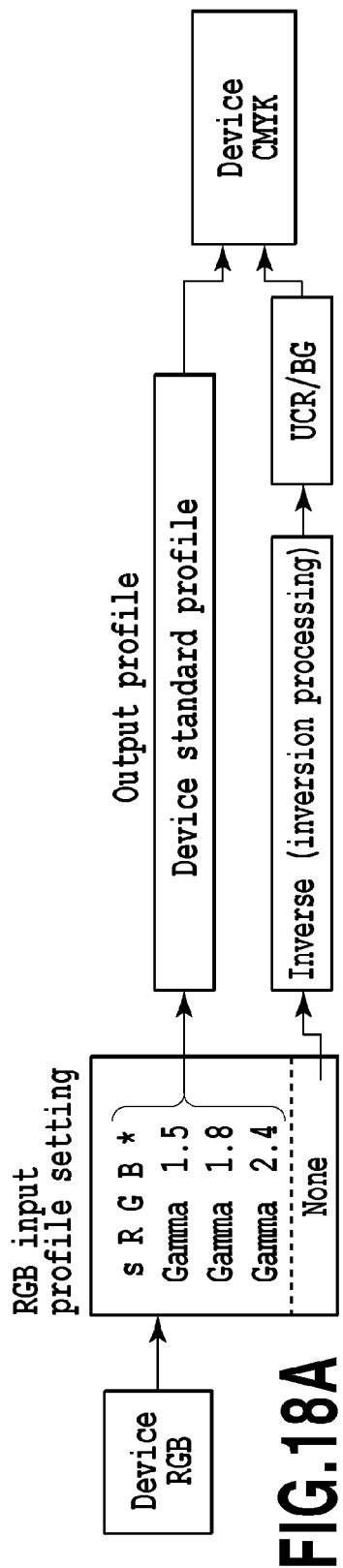
FIGS. 18A to 18C are explanatory diagrams of color conversion processing from a variety of color spaces into the CMYK color space.

FIG. 18A is an explanatory diagram showing an outline of the conversion into the CMYK color space in the case where the color space of input print data is the RGB (DeviceRGB). In FIG. 18A, in the case where the setting of an RGB input profile is "sRGB", "Gamma 1.5", "Gamma 1.8", or "Gamma 2.4", the "device standard profile", which is the output profile including the device standard color conversion table, is used. Then, the DeviceRGB is converted into DeviceCMYK. On the other hand, in the case where the setting of the RGB input profile is "None", the output profile including the device standard color conversion table is not used and the DeviceRGB is converted into the DeviceCMYK by "Inverse (inversion processing)" and "UCR/BG processing". In other words, in order to convert an RGB signal consisting of Red, Green, and Blue from a lightness signal into a density signal, the RGB signal is inverted into a CMY signal in an Inverse unit and then under colors are removed and black is generated in a UCR/BG unit, thereby a CMYK signal is generated. Here, the UCR stands for "Under Color Removal" and BG stands for "Black Generation". The default setting of the RGB input profile is "sRGB", and therefore, the device standard color conversion table is used as a result.

Figure 18B:
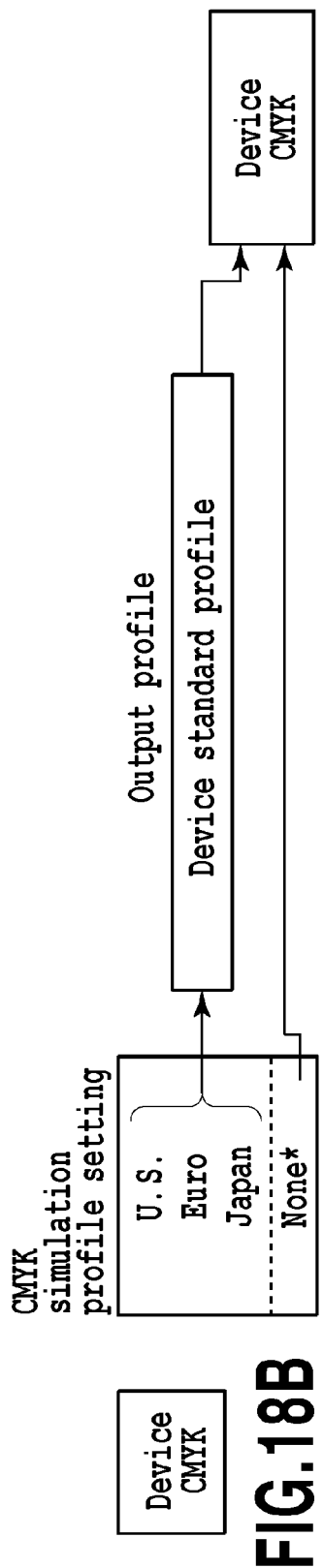

FIG. 18B is an explanatory diagram showing an outline of the conversion into the CMYK color space in the case where the color space of input print data is the CMYK (DeviceCMYK). In FIG. 18B, in the case where the setting of a CMYK simulation profile is "U.S", "Euro", or "Japan", the "device standard profile", which is the output profile including the device standard color conversion table, is used. Then, the DeviceCMYK is converted into the DeviceCMYK. On the other hand, in the case where the setting of the CMYK simulation profile is "None", the DeviceCMYK of the input signal is output as it is as the DeviceCMYK. The default setting of the CMYK simulation profile is "None", and therefore, the device standard color conversion table is not used.

Figure 18C:
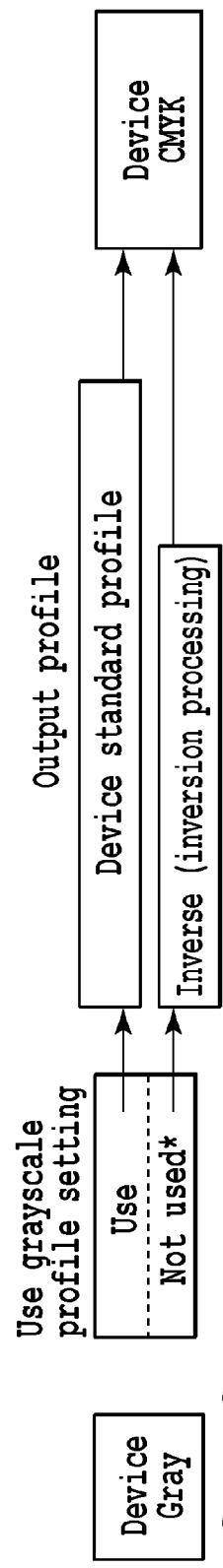

FIG. 18C is an explanatory diagram showing an outline of the conversion into the CMYK color space in the case where the color space of input print data is the Gray (DeviceGray). In FIG. 18C, in the case where the setting of a Use grayscale profile is "Use", the "device standard profile", which is the output profile including the device standard color conversion table, is used. Then, the DeviceGray is converted into the DeviceCMYK. On the other hand, in the case where the setting of the Use grayscale profile is "Not used", the output profile including the device standard color conversion table is not used and the Gray is converted into K with C=0, M=0, and Y=0 by "Inverse (inversion processing)" and is output as the DeviceCMYK. In other words, in the case of the Gray color alone, the lightness and the density are inverted, and therefore, the Gray color is inverted in the Inverse unit and the K component is generated, thereby the CMYK signal including only K is generated. The default setting of the Use grayscale profile is "Not used", and therefore, the device standard color conversion table is not used.

Here, as to the nonstandard signal 1601 that is generated accompanying the CMYK based color conversion processing in the present embodiment, a specific example is given by using the case where the contents of the profile setting are the default setting as an example. FIGS. 19A and 19B are diagrams each showing a color space of an object(s) within a page in input print data consisting of one page. Within the page in FIG. 19A, only an object whose color space is the DeviceRGB exists. The default setting in the case where the input color space is the DeviceRGB is "sRGB", and therefore, the device standard color conversion table is used (see FIG. 18A). Consequently, the value of the nonstandard signal 1601 that is generated in this case is "0=OFF".

In contrast to this, within the page in FIG. 19B, in addition to the object whose color space is the DeviceRGB, an object whose color space is the DeviceCMYK also exists. Then, the default setting in the case where the input color space is the DeviceCMYK is "None", and therefore, the device standard color conversion table is not used (see FIG. 18B). Consequently, the value the nonstandard signal 1601 that is generated in this case is "0=OFF" for the object whose color space is the DeviceRGB, and "1=ON" for the object whose color space is the DeviceCMYK.

As described above, the nonstandard signal 1601 is generated in accordance with the color space of each object that exists within the page of the input print data. Then, in the method of predicting gray from the device standard color conversion table, there is a possibility that unintended results will be obtained by performing K monochromatization in the case where the device standard color conversion table is not used. By generating the nonstandard signal 1601 in accordance with the color space of each object that exists within the page of the input print data and by determining whether or not K monochromatization processing is necessary based on the nonstandard signal, it is made possible to prevent the occurrence of a situation where improper K monochromatization such as this is performed.

Explanation is returned to the flowchart in FIG. 17.

At step 1705, the CMYK rendering unit 1002 generates a bitmap image in the CMYK color space for each page based on the DL created at step 1704. Further, the CMYK rendering unit 1002 generates the rendering color space signal 1302 indicating that rendering has been performed in the CMYK color space and outputs the rendering color space signal 1302 to the common K monochromatization determination unit 1301.

At step 1706, the common K monochromatization determination unit 1301 determines whether or not K monochromatization is necessary based on the rendering color space signal 1302, the nonstandard signal 1601, and the setting contents of the K monochromatization processing setting, and generates the K monochromatization determination signal 1303. Specifically, the operation is as follows.

In the case where the rendering color space signal 1302 indicates the RGB, the same processing as that at step 1505 in the third embodiment described previously is performed. In other words, in the case where the "Auto" button or the "Perform" button is selected on the K monochromatization processing setting screen 1400, K monochromatization is determined to be necessary and the K monochromatization determination signal 1303 of "ON" is generated. On the other hand, in the case where the "Do not perform" button is selected, it is determined that K monochromatization is not necessary and the K monochromatization determination signal 1303 of "OFF" is generated.

In contrast to this, in the case where the rendering color space signal 1302 indicates the CMYK, the contents of the K monochromatization determination signal 1303 are determined from the nonstandard signal 1601 and the setting contents of the K monochromatization processing setting. In other words, in the case where the "Auto" button is selected on the K monochromatization processing setting screen 1400 and the nonstandard signal 1601 is OFF, the K monochromatization determination signal 1303 of "ON" is generates. Then, in the case where the "Auto" button is selected similarly but the nonstandard signal 1601 is ON, the K monochromatization determination signal 1303 of "OFF" is generated. Further, in the case where the "Perform" button is selected on the K monochromatization processing setting screen 1400, the K monochromatization determination signal 1303 of "ON" is generated regardless of the nonstandard signal 1601 and in the case where the "Do not perform" button is selected, the K monochromatization determination signal 1303 of "OFF" is generated regardless of the nonstandard signal 1601. Here, whether the K monochromatization processing is performed is determined based on the nonstandard signal 1601 and the setting contents of the K monochromatization processing setting, but it may also be possible to perform the determination by a simpler method. For example, it may also be possible to adopt a determination method in which in the case of the CMYK rendering where a variety of color spaces may be intermingled, the K monochromatization processing is not performed without exception and in the case of the RGB rendering where such a possibility does not exist, the K monochromatization processing is performed.

After the common K monochromatization determination processing, through the CMYK monochrome determination processing (step 1707), the printer is activated in a predetermined operation mode (step 1708). After the printer activates, the processing at each of step 1709 and subsequent steps is performed by the image processing unit 105.

In other words, after the edge determination processing (step 1709), whether or not each pixel is gray is determined for the bitmap data in the CMYK color space by the common gray determination unit 1304 at step 1710. In the case where the results of the determination indicate that a pixel is a gray pixel with R=G=B, the gray determination signal 1306 of "1 (achromatic color)" is generated and in the case of a non-gray pixel, the gray determination signal 1306 of "0 (chromatic color)" is generated and output to the common K monochromatization unit 1305.

Then, at step 1711, the common K monochromatization unit 1305 performs processing (common K monochromatization processing) to convert the specific CMYK values into bitmap data of the CMYK values of the K monochrome by using the K monochromatization determination signal 1303, the edge determination signal 210, and the gray determination signal 1306. Specifically, the CMYK values of the pixel, which is a gray pixel, an edge pixel, and a K monochromatization ON pixel, are converted into the CMYK values of the K monochrome.

The subsequent steps 1712 to 1714 correspond to steps 1111 to 1113, respectively, in the flow in FIG. 11 of the second embodiment, and therefore, explanation is omitted.

The above is the flow of the printing processing in the printing apparatus 100 in the case where the rendering color space is the CMYK color space according to the present embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041633, filed Mar. 4, 2014, and No. 2014-239163, filed Nov. 26, 2014, which are hereby incorporated by reference wherein in their entirety.

What is claimed is:

1. An apparatus comprising:
    an attribute determination unit configured to determine an attribute of an object included in image data to be subjected to printing processing;
    a color conversion unit configured to convert the color space of the image data into a color space compatible with a printing apparatus in accordance with the determination results obtained by the attribute determination unit;
    an edge determination unit configured to determine an edge of an object included in the image data whose color space has been converted by the color conversion unit; and
    a black monochromatization unit configured to convert the color of a pixel, which is a pixel of an achromatic object of the objects of the image data whose color space has been converted into the color space compatible with the printing apparatus and which is a pixel determined to be an edge by the edge determination unit, into black alone.

2. The apparatus according to claim 1, wherein
the color conversion unit performs:
    gray compensation color conversion, in a case where the attribute determined by the attribute determination unit is an attribute that is not required to have smooth gradation properties, for a pixel corresponding to the object having the attribute; and
    non-gray compensation color conversion, in a case where the attribute determined by the attribute determination unit is an attribute that is required to have smooth gradation properties, for a pixel corresponding to the object having the attribute.

3. The apparatus according to claim 1, wherein
the attribute that is not required to have smooth gradation properties is a character and a line.

4. The apparatus according to claim 1, wherein
the color space compatible with the printing apparatus is a CMYK color space.

5. The apparatus according to claim 4, wherein
the color space of the image data is an RGB color space,
the black monochromatization unit converts the color of a pixel, which is a pixel of an achromatic object and which is determined to be an edge by the edge determination unit, into black alone by finding a value that satisfies R=G=B from K and one color other than K of CMYK.

6. The apparatus according to claim 1, further comprising:
a first color/monochrome determination unit configured to determine whether the image data whose color space has been converted by the color conversion unit is color or monochrome; and
a control unit configured to control an operation mode of a printer engine in the printing apparatus, wherein
the control unit activates the printer engine in a color mode or in a monochrome mode in accordance with the determination results obtained by the first color/monochrome determination unit.

7. The apparatus according to claim 6, further comprising:
a unit configured to generate color/monochrome information indicative of whether the image data whose color space has been converted by the color conversion unit is color or monochrome based on the determination results obtained by the first color/monochrome determination unit;

a second color/monochrome determination unit configured to determine whether the image data whose color space has been converted by the color conversion unit is color or monochrome after the printer engine is activated by the control unit; and a unit configured to update the color/monochrome information based on the determination results obtained by the second color/monochrome determination unit.

8. The apparatus according to claim 7, wherein in a case where a plurality of copies of the same image data is printed in the printing apparatus, the control unit controls the activation of the printer engine in printing processing of the second and subsequent copies based on the color/monochrome information.

9. The apparatus according to claim 7, wherein the color/monochrome information is generated for each page.

10. The apparatus according to claim 6, further comprising:

a sequence determination unit configured to determine whether the sequence of the printing processing is a sequence capable of reducing the printing processing time by activating the printer engine in accordance with the determination results obtained by the first color/monochrome determination unit, wherein in a case where the sequence determination unit determines that the printing processing time can be reduced, the control unit activates the printer engine in accordance with the determination results obtained by the first color/monochrome determination unit.

11. A printing apparatus comprising the apparatus according to claim 1.

12. A control method of printing, the method comprising the steps of:

determining an attribute of an object included in image data to be subjected to printing processing;

converting the color space of the image data into a color space compatible with a printing apparatus in accordance with the determination results obtained in the attribute determination step;

determining an edge of an object included in the image data whose color space has been converted in the color conversion step; and converting the color of a pixel, which is a pixel of an achromatic object of the objects of the image data whose color space has been converted into the color space compatible with the printing apparatus and which is a pixel determined to be an edge in the edge determination step, into black alone.

13. A non-transitory computer readable storage medium storing a program for causing a computer to perform the method according to claim 12.

14. An apparatus comprising:

an attribute determination unit configured to determine an attribute of an object included in image data to be subjected to printing processing;

a color conversion unit configured to perform gray compensation color conversion in a case where the determination results obtained by the attribute determination unit are a character or a line and to perform non-gray compensation color conversion in a case of a photo;

an edge determination unit configured to determine an edge from the image data whose color space has been converted by the color conversion unit; and a black monochromatization unit configured to convert, in a case where a pixel of the image data whose color space has been converted by the color conversion unit, which is determined to be an edge by the edge determination unit, is gray, the pixel into a pixel having black alone.

* * * * *